(12) United States Patent
Tsukuda et al.

(10) Patent No.: US 7,361,456 B2
(45) Date of Patent: Apr. 22, 2008

(54) METHOD OF MANUFACTURING MASTER DISK, APPARATUS OF MANUFACTURING MASTER DISK, METHOD OF DETECTING MOVING DISTANCE DIFFERENCE OF MASTER DISK, AND APPARATUS OF DETECTING MOVING DISTANCE DIFFERENCE OF MASTER DISK

(75) Inventors: Masahiko Tsukuda, Osaka (JP); Shinya Abe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/570,962

(22) PCT Filed: Sep. 3, 2004

(86) PCT No.: PCT/JP2004/013180

§ 371 (c)(1),
(2), (4) Date: Mar. 8, 2006

(87) PCT Pub. No.: WO2005/024807

PCT Pub. Date: Mar. 17, 2005

(65) Prior Publication Data

US 2006/0248967 A1 Nov. 9, 2006

(30) Foreign Application Priority Data

Sep. 8, 2003 (JP) ............................. 2003-315998

(51) Int. Cl.
*G11B 7/26* (2006.01)
*G03C 5/00* (2006.01)

(52) U.S. Cl. ...................... 430/321; 430/320; 430/945; 369/109; 369/197

(58) Field of Classification Search .................... None
See application file for complete search history.

(56) References Cited

U.S. PATENT DOCUMENTS 4,339,198 A * 7/1982 Leuchter, Jr. ............... 356/144
5,043,965 A * 8/1991 Iida et al. ................. 369/44.13

(Continued)

FOREIGN PATENT DOCUMENTS

EP 651232 * 5/1995

(Continued)

OTHER PUBLICATIONS

Japanese Search Report for PCT/JP2004/013180, dated Dec. 28, 2004, and English translation thereof.

*Primary Examiner*—Martin Angebranndt
(74) *Attorney, Agent, or Firm*—Ratner Prestia

(57) ABSTRACT

A method is provided for manufacturing a master disk in which there is precise feeding accuracy of the master disk by using a horizontally moving device which moves with curvature. The method of manufacturing a master disk includes the steps of rotating a resist master disk; moving the resist master disk; reading a moving distance on a path of the center point of the resist master disk associated with the movement; detecting a difference between the moving distance on the path of the center point and a moving distance on a straight line of the center point of the resist master disk associated with the movement; and controlling a predetermined manufacturing parameter on the basis of the detection result.

15 Claims, 20 Drawing Sheets

U.S. PATENT DOCUMENTS

| | | | | |
|---|---|---|---|---|
| 5,119,359 A | * | 6/1992 | Miyagi et al. | 369/112.05 |
| 5,568,337 A | * | 10/1996 | Eguchi et al. | 360/78.11 |
| 5,796,711 A | * | 8/1998 | Tomita et al. | 369/275.4 |
| 5,798,999 A | * | 8/1998 | Labinsky et al. | 369/266 |
| 6,203,968 B1 | * | 3/2001 | Igarashi | 430/320 |
| 2003/0021214 A1 | * | 1/2003 | Tsukuda et al. | 369/112.02 |

FOREIGN PATENT DOCUMENTS

| | | | |
|---|---|---|---|
| JP | 63-011043 | * | 1/1988 |
| JP | 01-129436 | * | 5/1989 |
| JP | 07-065385 | * | 3/1995 |
| JP | 2002-141012 | | 5/2002 |
| JP | 2002-324312 | * | 11/2002 |
| WO | WO 97/11459 A1 | | 3/1997 |
| WO | 03/042985 | * | 5/2003 |

* cited by examiner

METHOD OF MANUFACTURING MASTER DISK, APPARATUS OF MANUFACTURING MASTER DISK, METHOD OF DETECTING MOVING DISTANCE DIFFERENCE OF MASTER DISK, AND APPARATUS OF DETECTING MOVING DISTANCE DIFFERENCE OF MASTER DISK

This application is a U.S. national phase application of PCT International Application PCT/JP2004/013180.

TECHNICAL FIELD

The present invention relates to a method of manufacturing an master disk, a method of detecting a moving distance difference of the master disk, an apparatus of manufacturing the master disk, an apparatus of detecting a moving distance difference of the master disk, a method of inspecting the master disk, and an apparatus of inspecting the master disk, which are useful for the case where signals are accurately recorded in a spiral form on the master disk, as in the case of an optical disk.

BACKGROUND ART

Generally, a manufacturing process of an optical disk comprises: a step of exposing an master disk coated with a photoresist by using an optical disk master disk recording apparatus using a laser, an electron beam and the like as a source of the exposure, and for producing an optical master disk on the surface of which protruding and recessed patterns such as information pits and grooves are formed by developing the exposed master disk; a step of producing a metal mold referred to as a stamper to which the protruding and recessed patterns are transferred from the optical master disk; a step of producing a molding substrate made of a resin by using the stamper; and a step of making a recording film, a reflective and the like formed on the molding substrate and laminated.

As an example of a master disk recording apparatus of recording patterns such as information pits and grooves of an optical disk, an electron beam recording apparatus which uses an electron beam as a recording beam is shown in FIG. 17.

The electron beam recording apparatus has at least a structure in which an electronic column 203 constituted with an electron beam source 201 for generating an electron beam, and with an electro-optical system 202 for focusing the emitted electron beam on a resist master disk 210 so as to record an information pattern on the resist master disk 210 in accordance with an inputted information signal, is provided in a vacuum vessel 213.

The electron beam source 201 which has a filament for emitting electrons by carrying a current, electrodes for confining the emitted electrons, electrodes of extracting and accelerating an electron beam, and the like, is capable of emitting the electrons from one point.

The electro-optical system 202 has a lens 204 for focusing the electron beam, an aperture 205 of determining the beam diameter of the electron beam, electrodes 206, 207 for deflecting the electron beam in accordance with an inputted information signal, a shielding plate 208 for shielding the electron beam deflected by the electrode 206, and a lens 209 for focusing the electron beam on the surface of the resist master disk 210.

The resist master disk 210 is held on a rotating device 211, and moved horizontally together with the rotating device 211 by a horizontally moving device 212. When the resist master disk 210 is moved horizontally as it is rotated, the electron beam can be spirally irradiated on the resist master disk 210, so that the information signal of the optical disk can be spirally recorded on the master disk.

A focus adjusting grid 214 is provided substantially at the same level as the surface of the resist master disk 210. The focus adjusting grid 214 is provided to adjust the focus position of the lens 209 so as to make the electron beam focused on the surface of the resist master disk 210. The electron beam is irradiated on the focus adjusting grid 214, and reflected electrons reflected by the focus adjusting grid 214 and secondary electrons emitted from the focus adjusting grid 214 are detected by a detector, so that the focus position of the lens 209 can be adjusted by the focus adjusting grid 214 on the basis of the view of the monitored grid image.

The electrode 206 is provided to deflect the electron beam to a direction substantially perpendicular to the moving direction of the horizontally moving device 212. The electrode 206 deflects the electron beam toward the shielding plate 208 in accordance with a signal inputted to the electrode 206, so that it is possible to select whether the electron beam is irradiated on the resist master disk 210 or not, and to thereby record an information pit pattern and the like on the resist master disk 210.

The electrode 207 is provided to deflect the electron beam in a direction substantially perpendicular to the electrode 206, and is capable of deflecting the electron beam in a direction substantially the same as the moving direction of the horizontally moving device 212 in accordance with a signal inputted to the electrode 207. The moving direction of the horizontally moving device 212 corresponds to the radial direction of the resist master disk 210 to be recorded, and it is possible to correct a fluctuation of the track pitch of the optical disk, and the like, by the signal inputted to the electrode 207.

The horizontally moving device 212 includes, for example, a screw feed type as shown in FIG. 18, in which a screw 301 is rotated by a motor 302 so as to make a resist master disk 303 linearly fed by a screw pitch provided for a stage 304 holding the resist master disk 303, or a swing arm type as shown in FIG. 19, in which a resist master disk 402 is fed with curvature by an arm 403 as the resist master disk 402 is rotated about one point 401. A length measuring apparatus, such as a laser interference length measuring meter, is mainly used as a position detecting device of the horizontally moving device 212, which is used to improve the feeding accuracy of the horizontally moving device 212, and the like. In the horizontally moving device 212 having a linear feeding structure, as shown in FIG. 18, a laser beam is irradiated by the laser interference length measuring meter and the like from the outside to a target provided on the horizontally moving device 212, and the position of the horizontally moving device 212 is measured from an interference pattern and the like, formed by reflected light beams reflected from the target, and the like, whereby the deviation amount from a desired position is detected. As a result, it is possible to drive the horizontally moving device 212 so as to correct the detected deviation, or to drive the electrode 207 and the like to control the irradiation position of the electron beam (Japanese Patent Laid-Open No. 2002-141012).

In the horizontally moving device 212 of the swing arm type as shown in FIG. 19, unlike the case of linear feeding, it is difficult to use the laser interference length measuring meter and the like, because of the characteristic that the position measuring point is moved with curvature. In the case where an optical disk having an information density approximately equal to a CD and a DVD is produced, the allowable value of fluctuation amount of the track pitch of the optical disk is large. Thus, even when the horizontally moving device 212 such as of the swing arm type which moves with curvature is used, the recording operation can be performed with sufficient accuracy only by monitoring the precision of a motor of driving the arm and the output of an encoder and the like provided for the rotating shaft of the motor, without using a length measuring apparatus such as a laser interferometer.

However, in a next generation optical disk storing a large volume of information such as digital High Vision information, the track pitch is reduced to roughly a half in comparison with the DVD, and the allowable value of fluctuation amount of the track pitch is also significantly reduced. For this reason, it is necessary to introduce a system capable of performing accurate position detection and position control by servo, even in the horizontally moving device 212 such as of the swing arm type which moves with curvature.

That is, in the case of the swing arm type, the electron beam is moved along a path shown by a dotted line in FIG. 19 in association with the movement of the horizontally moving device 212. The path has a circular arc shape centered on the point 401, which causes a deviation from a straight line in the radial direction of the resist master disk 402. As the deviation is increased, the deviation of the track pitch is also increased. In producing the large capacity next generation optical disk as described above, the deviation of the track pitch becomes a problem. For example, in the example shown in FIG. 19, the track pitch of the peripheral edge part of the resist master disk 402 is narrower than that of the center part.

Further, in the region where the track pitch is narrowed, the track pitch may be fluctuated by vibration and the like. Such fluctuation of the track pitch also becomes a problem in producing the large capacity next generation optical disk.

FIG. 20 shows a cross-section of the electron beam recording apparatus provided with the horizontally moving device 212 of the screw feed type shown in FIG. 18. The position of the horizontally moving device 212 can be corrected with respect to a portion for fixing a laser interference length measuring meter 305 (for example, in the case of the electron beam recording apparatus, a bottom surface 306 of the vacuum vessel, to which the base of the horizontally moving device 212 is fixed). However, in practice, there may be a case where the relative positional relationship between the recording beam focusing device for focusing the recording beam (for example, the electronic column in the case of the electron beam recording apparatus) and the horizontally moving device 212 can not be sufficiently corrected. In this case, such correction is not enough to improve the feeding accuracy of the spiral pattern of the optical disk and the like which is formed by irradiating the recording beam on the resist master disk 210.

DISCLOSURE OF THE INVENTION

In view of the above described problems, an object of the present invention is to provide a method of manufacturing a master disk, an apparatus of manufacturing the master disk, a method of detecting a moving distance difference of the master disk, an apparatus of detecting a moving distance difference of the master disk, a method of inspecting the master disk, and an apparatus of inspecting the master disk, which make it possible to realize a precise feeding accuracy of the master disk by using the horizontally moving device which moves with curvature.

Another object of the present invention is to provide a method of manufacturing a master disk, an apparatus of manufacturing the master disk, a method of inspecting the master disk, and an apparatus of inspecting the master disk, which are capable of grasping the relative positional relationship between the horizontally moving device and the recording beam focusing device.

In order to solve the above problems, a first aspect of the present invention is a method of manufacturing a master disk, comprising: a step of rotating a master disk;

a step of moving said master disk;

a step of reading a moving distance on a path of the center point of said master disk associated with said movement;

a step of detecting a difference between the moving distance on the path of said center point and a moving distance on a straight line of the center point of said master disk associated with the movement; and a step of controlling a predetermined manufacturing parameter on the basis of said detection result.

A second aspect of the present invention is the method of manufacturing the master disk according to the first aspect of the present invention, wherein the movement of said master disk is a revolution about a rotation center different from the center point of said master disk.

A third aspect of the present invention is the method of manufacturing the master disk according to the second aspect of the present invention, wherein the rotation of said master disk is performed at one end of an arm having a longitudinal shape, and the revolution of said master disk is a revolution about a rotation center of said arm, and wherein the moving distance on the path of the center point of said master disk is read by utilizing a predetermined pattern provided for an end surface of said arm.

A fourth aspect of the present invention is the method of manufacturing the master disk according to the third aspect of the present invention, wherein the moving distance on the path of the center point of said master disk is read by irradiating a laser beam to a hologram pattern provided for the end surface of the arm, the hologram pattern being similar to the path of said center point, and by counting interference fringes of diffracted light beams of said irradiated laser beam.

A fifth aspect of the present invention is the method of manufacturing the master disk according to the third aspect of the present invention, wherein the moving distance on the path of said center point is read by counting a magnetic pattern provided for the end surface of said arm by a magnetic head.

A sixth aspect of the present invention is the method of manufacturing the master disk according to the third aspect of the present invention, wherein the moving distance on the path of said center point is read by irradiating a laser beam to a straight hologram pattern provided for the end surface of said arm, and by measuring an interval of interference fringes of diffracted light beams of said irradiated laser beam.

A seventh aspect of the present invention is the method of manufacturing the master disk according to the sixth aspect of the present invention, wherein the measurement of intervals of said interference fringes is performed by using a limit point of the rotation of said arm as a reference.

An eighth aspect of the present invention is the method of manufacturing the master disk according to the first aspect of the present invention, wherein the step of controlling said predetermined manufacturing parameter is a step of controlling a position of beam irradiation to said master disk.

A ninth aspect of the present invention is the method of manufacturing the master disk according to the eighth aspect of the present invention, wherein the control of the position of said beam irradiation is performed by deflecting an electron beam by an electric field.

A tenth aspect of the present invention is the method of manufacturing the master disk according to the eighth aspect of the present invention, wherein the control of the position of said beam irradiation is performed by deflecting a laser beam by using AOD.

An eleventh aspect of the present invention is the method of manufacturing the master disk according to the eighth aspect of the present invention, wherein the control of the position of said beam irradiation is performed by deflecting a laser beam by using EOD.

A twelfth aspect of the present invention is the method of manufacturing the master disk according to the eighth aspect of the present invention, wherein the control of the position of said beam irradiation is performed by deflecting a laser beam irradiated from a laser beam source by deflecting said laser beam source with a piezoelectric element.

A thirteenth aspect of the present invention is the method of manufacturing the master disk according to the first aspect of the present invention wherein the step of controlling said predetermined manufacturing parameter is a step of controlling said moving speed.

A fourteenth aspect of the present invention is the method of manufacturing the master disk according to the sixth aspect of the present invention, wherein the step of controlling the predetermined manufacturing parameter is a step of controlling said rotation speed.

A fifteenth aspect of the present invention is the method of manufacturing the master disk according to the fourteenth aspect of the present invention, wherein said rotation speed is controlled on the basis of a measured value of an interval of interference fringes of said diffracted light beams, a recording linear velocity and a feeding pitch.

A sixteenth aspect of the present invention is an apparatus of manufacturing a master disk, comprising: a rotating device which rotates a master disk;

a moving device which moves said master disk;

a moving distance reading device which reads a moving distance on a path of the center point of said master disk associated with said movement;

a detecting device which detects a difference between the moving distance on the path of said center point read by said moving distance reading device and a moving distance on a straight line of the center point of said master disk associated with said movement; and a control device which controls a predetermined manufacturing parameter on the basis of said detection result.

A seventeenth aspect of the present invention is a method of detecting a moving distance difference of a master disk comprising: a step of rotating a master disk;

a step of moving said master disk;

a step of reading a moving distance on a path of the center point of said master disk associated with said movement; and a step of detecting a difference between the moving distance on the path of said center point and a moving distance on a straight line of the center point of said master disk associated with said movement.

An eighteenth aspect of the present invention is an apparatus of detecting a moving distance difference of a master disk comprising: a rotating device which rotates a master disk;

a moving device which moves said master disk;

a moving distance reading device which reads a moving distance on a path of the center point of said master disk associated with said movement;

a detection device which detects a difference between the moving distance on the path of said center point read by said moving distance reading device and a moving distance on a straight line of the center point of said master disk associated with said movement.

A nineteenth aspect of the present invention provides a method of manufacturing a master disk, comprising: a step of rotating a master disk;

a step of moving said master disk;

a step of irradiating a beam to said master disk from a beam irradiating device which irradiates the beam to said master disk; and a step of reading a moving distance of said master disk from a reference having a predetermined relationship to said beam irradiating device, wherein a predetermined manufacturing parameter is controlled on the basis of said moving distance of said master disk read.

A twentieth aspect of the present invention provides the manufacturing method according to the nineteenth aspect of the present invention, wherein said reference is provided on said beam irradiating device.

A twenty first aspect of the present invention provides an apparatus of manufacturing a master disk, comprising: a rotating device which rotates a master disk;

a moving device which moves said master disk;

a beam irradiating device which irradiates a beam to said master disk;

a moving distance reading device which reads a moving distance of said master disk; and a reference which has a predetermined relationship to said beam irradiating device and which serves to read said moving distance, wherein the reading operation of said moving distance is performed by reading a distance between said reference and said master disk, and wherein a predetermined manufacturing parameter is controlled on the basis of said moving distance of said master disk read.

A twenty second aspect of the present invention provides a method of inspecting a master disk, comprising: a step of rotating a master disk;

a step of moving said master disk;

a step of irradiating a beam to said master disk from a beam irradiating device which irradiates the beam to said master disk;

a step of reading a moving distance of said master disk from a reference having a predetermined relationship to said beam irradiating device; and a step of comparing a distance to move said master disk with the moving distance read in said reading step in a predetermined period.

A twenty third aspect of the present invention provides an apparatus of inspecting a master disk, comprising: a rotating device which rotates a master disk;

a moving device which moves said master disk;

a beam irradiating device which irradiates a beam to said master disk;

a moving distance reading device which reads a moving distance of said master disk from a reference which has a predetermined relationship to said beam irradiating device; and a comparing device which compares a distance to move said master disk with said moving distance read, in a predetermined period.

A twenty fourth aspect of the present invention provides a method of manufacturing a master disk, comprising: a step of rotating a master disk;

a step of moving said master disk; and a step of controlling a predetermined manufacturing parameter on the basis of a position of said master disk.

A twenty fifth aspect of the present invention provides an apparatus of manufacturing a master disk, comprising: a rotating device which rotates a master disk;

a moving device which moves said master disk; and a controller which controls a predetermined manufacturing parameter on the basis of a position of said master disk.

According to the present invention, it is possible to provide a method of manufacturing a master disk, an apparatus of manufacturing the master disk, a method of detecting a moving distance difference of the master disk, an apparatus of detecting a moving distance difference of the master disk, a method of inspecting the master disk, and an apparatus of inspecting the master disk, which make it possible to realize a precise feeding accuracy of the master disk by using the horizontally moving device which moves with curvature.

Further, according to another aspect of the present invention, it is possible to provide a method of manufacturing a master disk, an apparatus of manufacturing the master disk, a method of inspecting the master disk, and an apparatus of inspecting the master disk, which are capable of grasping the relative positional relationship between the horizontally moving device and the recording beam focusing device.

DESCRIPTION OF SYMBOLS

Figure 1:
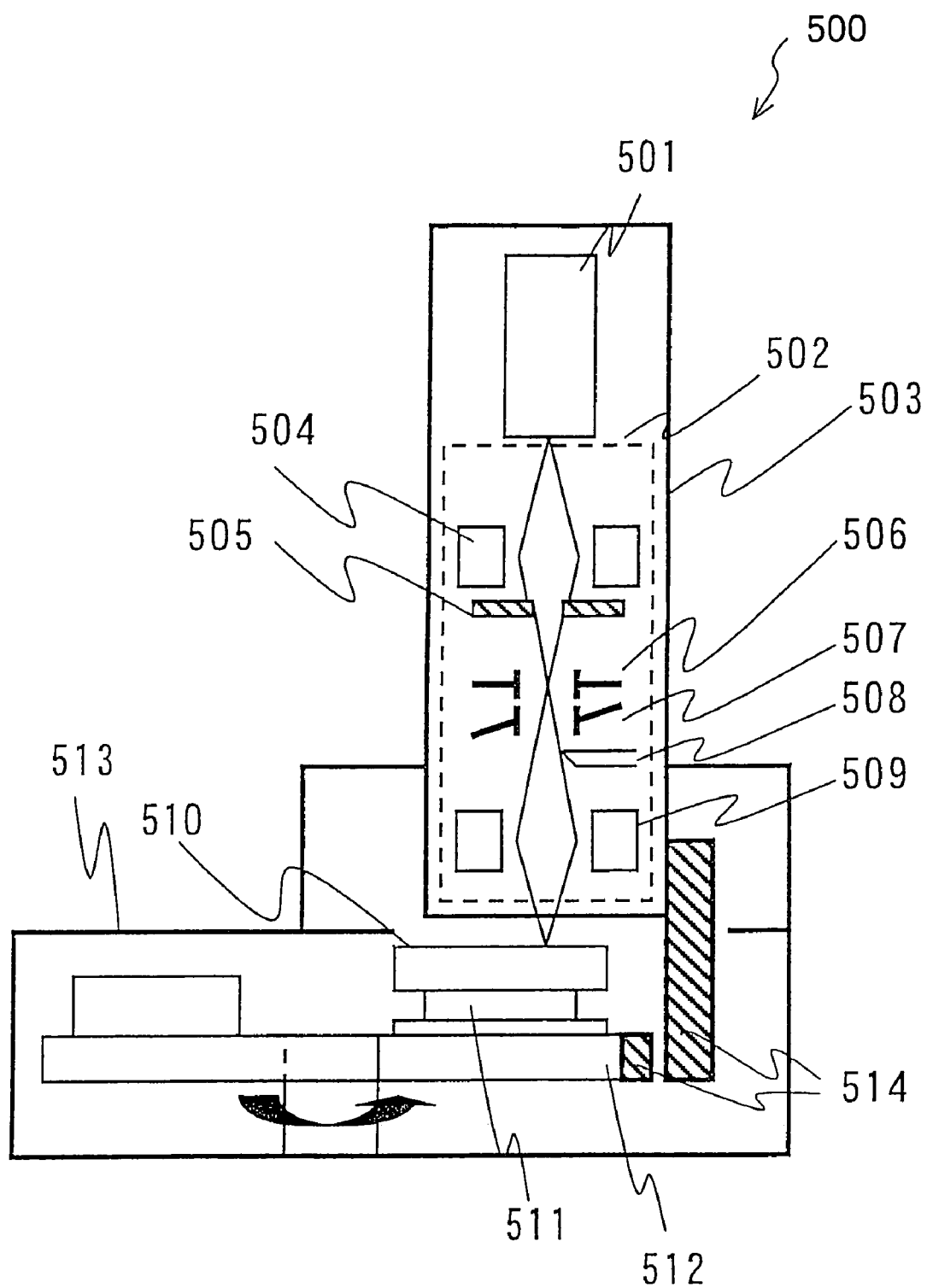
FIG. 1 is a figure showing an example of an apparatus of manufacturing a master disk in an embodiment 1 according to the present invention.

101 Laser beam source
102 Laser beam receiving section
103 Interference pattern measuring device
104 Master disk moving amount detecting device
105 Scale
106 Horizontally moving device
108 Master disk
109 Rotating device
112 Recording point moving amount correcting device
201 Electron beam source
202 Electro-optical system
203 Electronic column
204 Lens
205 Aperture
206, 207 Electrode
210 Resist master disk
211 Rotating device 212 Horizontally moving device
213 Vacuum vessel
214 Focus adjusting grid
301 Screw
302 Motor
403 Swing arm
514 Recording point fluctuation detecting device
604 Weight member
703 Rotation center of master disk
704 Rotation orbit of master disk
705 Revolution orbit of master disk
1502 Recording beam deflecting device (AOD)
1504 Recording beam focusing device
1602 Transducer
1604 0th order transmitted laser beam
1605 1st order diffraction laser beam
1701 Recording beam deflecting device (EOD)
1702 Controller
1802 Piezoelectric element

BEST MODE FOR CARRYING OUT THE INVENTION

In the following, embodiments according to the present invention will be described.

Embodiment 1

FIG. 1 shows an electron beam recording apparatus 500 as an example of an apparatus of manufacturing a master disk according to an embodiment 1. The electron beam recording apparatus 500 has a structure in which an electronic column 503 constituted with an electron beam source 501 which generates an electron beam, and with an electro-optical system 502 which focuses the emitted electron beam on a resist master disk 510 and which makes an information pattern recorded on the resist master disk 510 in accordance with an inputted information signal, is provided in a vacuum vessel 513.

The electron beam source 501 which has a filament for emitting electrons by carrying a current, electrodes of confining the emitted electrons, electrodes for extracting and accelerating an electron beam, and the like, is capable of emitting the electrons from one point.

The electro-optical system 502 has a lens 504 for focusing the electron beam, an aperture 505 for determining the beam diameter of the electron beam, electrodes 506, 507 for deflecting the electron beam in accordance with an inputted information signal, a shielding plate 508 for shielding the electron beam deflected by the electrode 506, and a lens 509 for focusing the electron beam on the surface of the resist master disk 510.

Further, the resist master disk 510 is held on a rotating device 511, and is moved horizontally together with the rotating device 511 by a horizontally moving device 512 corresponding to an example of the moving device according to the present invention. When the resist master disk 510 is moved horizontally as it is rotated, the electron beam can be spirally irradiated on the resist master disk 510, so as to make the information signal of an optical disk spirally recorded on the resist master disk 510.

The electrode 506 is provided to deflect the electron beam to the direction substantially perpendicular to the moving direction of the horizontally moving device 512. The electrode 506 deflects the electron beam to the side of the shielding plate 508 in accordance with a signal inputted to the electrode 506. Thereby, it is possible to select whether the electron beam is irradiated on the resist master disk 510 or not, so that an information pit pattern and the like can be recorded on the resist master disk 510.

The electrode 507 is provided to deflect the electron beam in a direction substantially perpendicular to the electrode 506, and is capable of deflecting the electron beam in a direction substantially the same as the moving direction of the horizontally moving device 512 in accordance with a signal inputted to the electrode 507. The moving direction of the horizontally moving device 512 corresponds to the radial direction of the resist master disk 510 to be recorded, and it is possible to correct a fluctuation of the track pitch of the optical disk, and the like, by the signal inputted to the electrode 507. Further, a recording point fluctuation detecting device 514 (corresponding to the moving distance reading device according to the present invention, as an example), which measures a relative positional relationship between the electronic column 503 and the horizontally moving device 512, is provided for the electronic column 503 (beam irradiating device).

Figure 2:
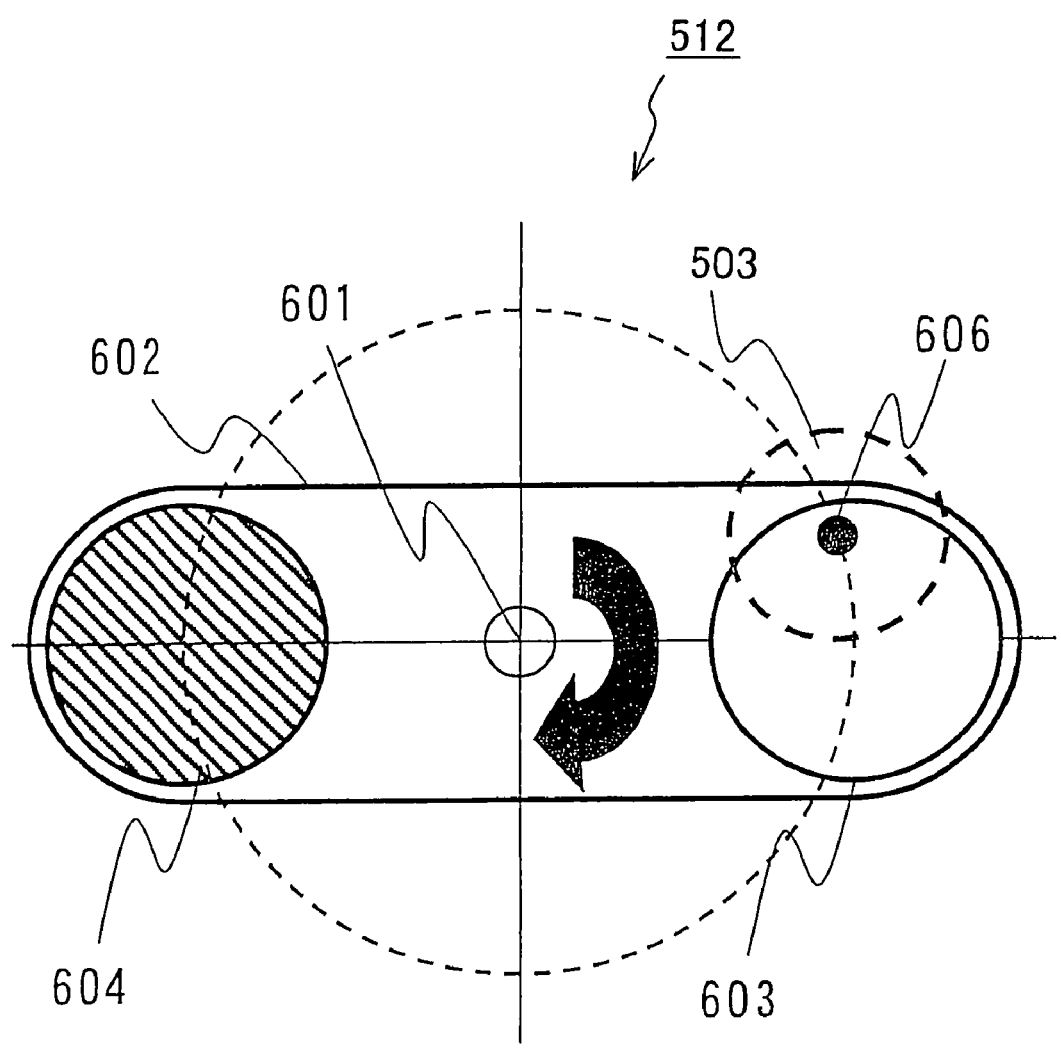
FIG. 2 is a schematic illustration in which a horizontally moving device which is a part of the apparatus of manufacturing the master disk according to the present invention, is seen from a side of a recording beam focusing device.

When seen from the side of the electronic column 503, as shown in FIG. 2, the horizontally moving device 512 has a structure in which an arm 602 is extended with a central axis 601 as a center, in which a rotating device 603 is held on a tip part of the arm 602, and in which a weight member 604 having a mass substantially the same as that of the rotating device 603, is loaded on the tip part of the arm 602 on the side opposite to the rotating device 603, so as to keep weight balance like a balance. The position of the resist master disk 510 to which the electron beam is irradiated, is fed by rotating the arm 602 about the central axis 601 as a center, on the rotating device 603. That is, the resist master disk 510 is revolved around the central axis 601 as a center, while being rotated by the rotating device 603. For this reason, when the horizontal position of the rotating device 603 is moved by the horizontally moving device 512, the central position 606 of the electronic column 503 (position to which the electron beam is irradiated), is moved along a circular arc passing through the center point of the rotating device 603 and centering around the central axis 601 as shown by a dotted line in FIG. 2.

Figure 3:
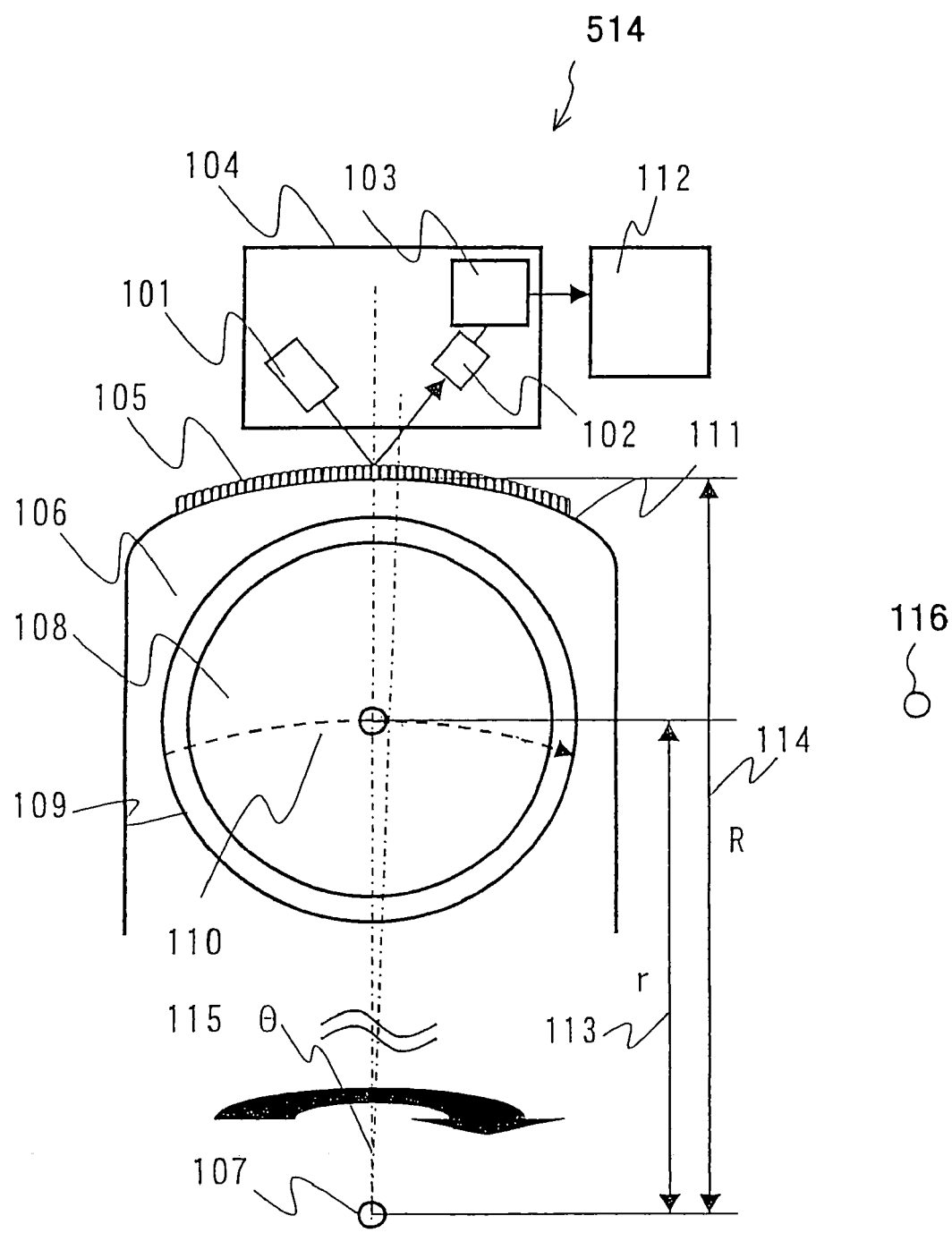
FIG. 3 is a schematic illustration showing the embodiment 1 of a recording point fluctuation detecting device which is a part of the apparatus of manufacturing the master disk according to the present invention.

The recording point fluctuation detecting device 514 which measures a relative positional relationship between the electronic column 503 and the horizontally moving device 512 in the electron beam recording apparatus 500 shown in FIG. 1 and FIG. 2, is shown in FIG. 3.

The recording point fluctuation detecting device 514 comprises a master disk moving amount detecting device 104 which has a laser beam source 101, the laser beam receiving section 102 and a interference pattern measuring device 103, and a scale 105 on which a hologram pattern which is an example of the predetermined pattern according to the present invention is formed. The master disk moving amount detecting device 104 is connected to the electronic column 503, and the scale 105 is connected to a horizontally moving device 106. A resist master disk 108 is held on a rotating device 109, and the rotating device 109 is provided on the horizontally moving device 106. The horizontally moving device 106 is rotated about a rotation center 107, and moves the rotating device with curvature. The scale 105 is provided on a side surface portion 111 having a shape similar to the rotation orbit 110 of the horizontally moving device 106. The surface portion 111 is formed on a circular arc concentric with the rotation orbit 110 centering around the rotation center 107. A laser beam is irradiated to the hologram pattern provided for the scale 105, and a light and dark pattern of interference fringes generated by making diffracted light beams reflected from the hologram pattern interfere with each other is counted by the interference pattern measuring device 103, whereby the position of the horizontally moving device 106 can be detected. Information from the master disk moving amount detecting device 104, which corresponds to the detecting device according to the present invention as an example, is inputted to a recording point moving amount correcting device 112.

The recording point fluctuation detecting device 514 operates as follows. That is, a method of detecting a moving distance difference of the resist master disk 108 is performed by the following operations.

Figure 4:
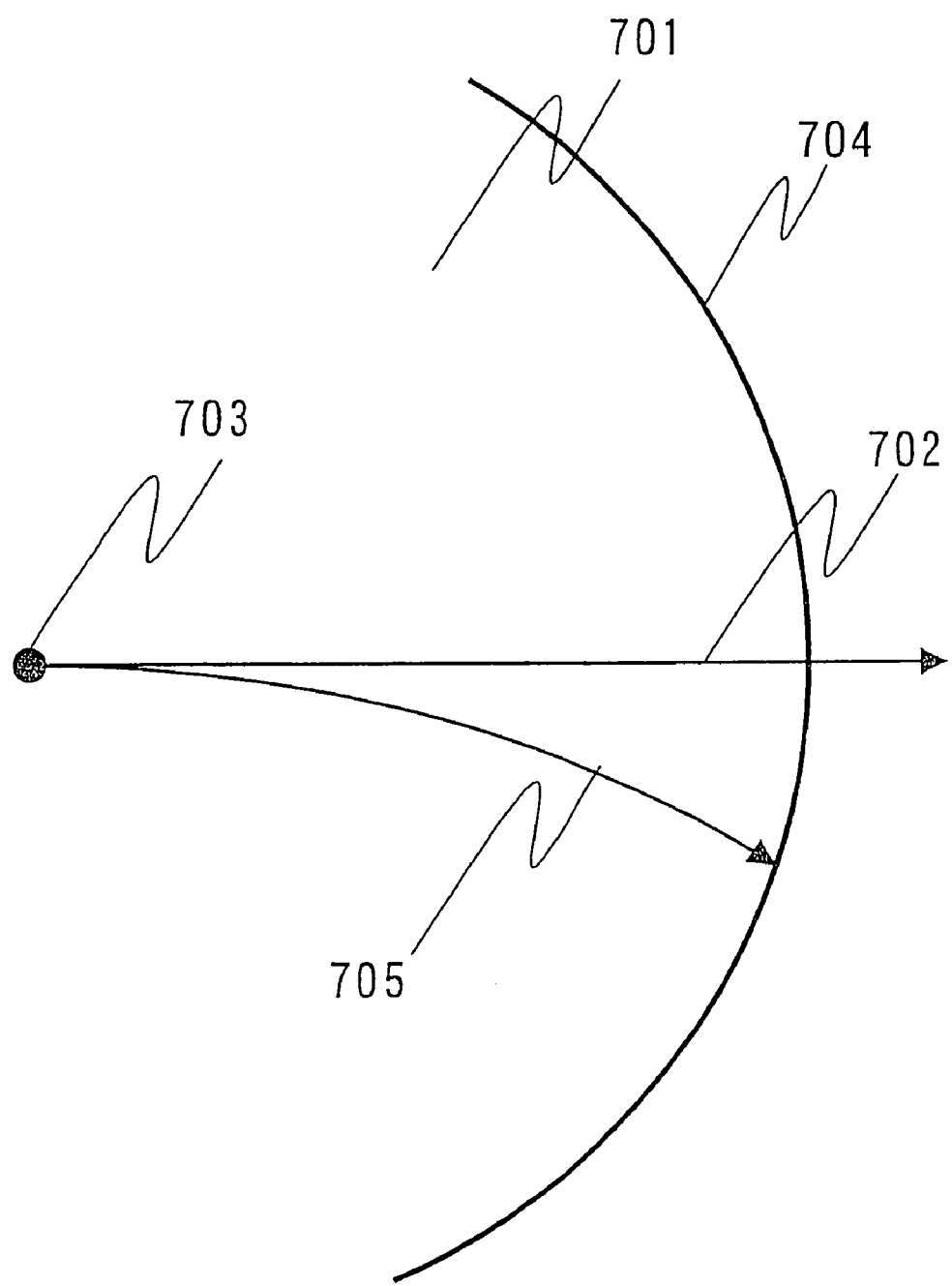
FIG. 4 is a figure explaining paths of recording beam irradiation position and of a recording point desired to be measured on the master disk, in the method of manufacturing the master disk according to the present invention.

FIG. 4 shows an orbit of a position on the master disk, to which the recording beam is to be irradiated, and an orbit of the recording point associated with a movement with curvature of a resist master disk 701. As shown by an arrow of a straight line orbit 702, the track pitch of an optical disk to be recorded on the resist master disk 701 needs to pass through a rotation center 703 of the resist master disk 701, and to be linearly recorded at equal intervals in the direction perpendicularly intersecting a rotation orbit 704 of the resist master disk 701. However, when the resist master disk 701 is moved with curvature, the position to which the recording beam is actually irradiated passes on an orbit 705. The orbit 705 is also a path of the rotation center 703 of the resist master disk 701, when the resist master disk 701 is turned (that is revolved) around the rotation center 107. When a laser beam is irradiated to the scale 105 which is provided with gratings at equal intervals and which is provided on the side surface portion 111 of the horizontally moving device 106, so as to measure the interference pattern, the position on the orbit 705 can be measured. In order to obtain the position on the straight line orbit 702, which is desired to be actually measured, from the measured position on the orbit 705, it is necessary to correct the deviation between the distance on the orbit 705 from the rotation center 703 and the distance on the straight line orbit 702 from the rotation center 703.

As shown by reference numeral 113 in FIG. 3, the distance from the rotation center 107 of the horizontally moving device 106 to the irradiation position of the recording beam is set to r (m). As shown by reference numeral 114, the distance from the rotation center 107 of the horizontally moving device 106 to the scale 105 is set to R (m). As shown by reference numeral 115, a moving angle is set to $\theta$ (rad) when the horizontally moving device 106 is moved by a minimum unit which can be detected by the scale 105. Then, the moving distance from the center of the master disk is represented by $nR\theta$ (m) (n=0, 1, 2, 3, . . . ). However, the position to which the recording beam is actually irradiated is apposition which is distant by $2r \cos[(\pi-n\theta)/2]$ from the center of the master disk, which causes a deviation from the measured value by means of the scale 105. For this reason, the deviation amount is corrected in the recording point movement amount correcting device 112.

By means of the scale 105, the moving distance can be measured at equal intervals by $R\theta$. That is, when the horizontally moving device is rotated at a uniform speed, the interference fringes are counted each time the scale is moved by $R\theta$. However, the position to which the recording beam is irradiated is the position distant by $2r \cos[(\pi-n\theta)/2]$ from the center of the master disk. Thus, even when the position to which the recording beam is irradiated is moved at equal intervals by $R\theta$, the movement is actually performed by $2r[\cos\{(\pi-n\theta)/2\}-\cos\{[\pi-(n-1)\theta]/2\}]$. For this reason, the deviation amount can be corrected by calculating the ratio of these values in the recording point moving amount correcting device 112. Further, in order to correct the deviation amount by the recording point moving amount correcting device 112, it is necessary to provide a reference point (origin). The reference point can be determined by the following methods. For example, the range where the horizontally moving device 106 can be moved is mechanically limited by, for example, a limiter 116. The origin of the recording point moving amount correcting device 112 is on an as-needed basis confirmed at the limit point of the moving range. When the origin is deviated, a resetting operation of the origin is performed, and the interference pattern is calculated from the position of the origin after the resetting operation.

Further, a laser interference length measuring apparatus of measuring the reference point and the like is provided in the vacuum vessel, so as to make it possible to measure a distance to the side surface portion of the horizontally moving device. The distance to the horizontally moving device is measured, when the horizontally moving device is moved to reach the reference point. Each time the horizontally moving device is moved to reach a predetermined distance, the origin of the recording point moving amount correcting device is confirmed. When the origin is deviated, the resetting operation of the origin is performed, and then the interference pattern is calculated from the position of the origin after the resetting operation.

In this way, by on an as-needed basis confirming the origin, it is possible to measure more accurately the moving distance of the horizontally moving device.

When the origin is deviated, the resetting operation of the origin is performed. Thereby, the resolution of the scale 105 can be improved by a ratio between the distance R from the rotation center 107 of the horizontally moving device 106 to the scale 105, and the distance r from the rotation center 107 to the radiation position of the recording beam.

Further, it is possible to monitor the fluctuation of the track pitch of the recorded resist master disk 108 by using this function, and to thereby determine the quality of the recorded master disk during the recording.

For example, the quality of master optical disk can be determined as follows.

The interval of interference fringes detected by the laser beam receiving section 102 is determined by the wave length of the laser beam and the grating intervals of the hologram pattern formed on the scale 105. The resolution of the recording point fluctuation which can be measured is determined by the interval of the adjoining interference fringes. Thus, if the interval of the adjoining interference fringes is set to be not more than an allowable deviation value of the track pitch, it is possible to determine whether a deviation of the track pitch is not more than the allowable value or not. By continuously monitoring the differential signal between the position information of the recording point fluctuation detecting device 514 and a desired position information at the time when the resist master disk 108 is actually recorded, it is possible to estimate whether the resist master disk 108 is produced to have a deviation of the track pitch within the allowable value or not.

Figure 5:
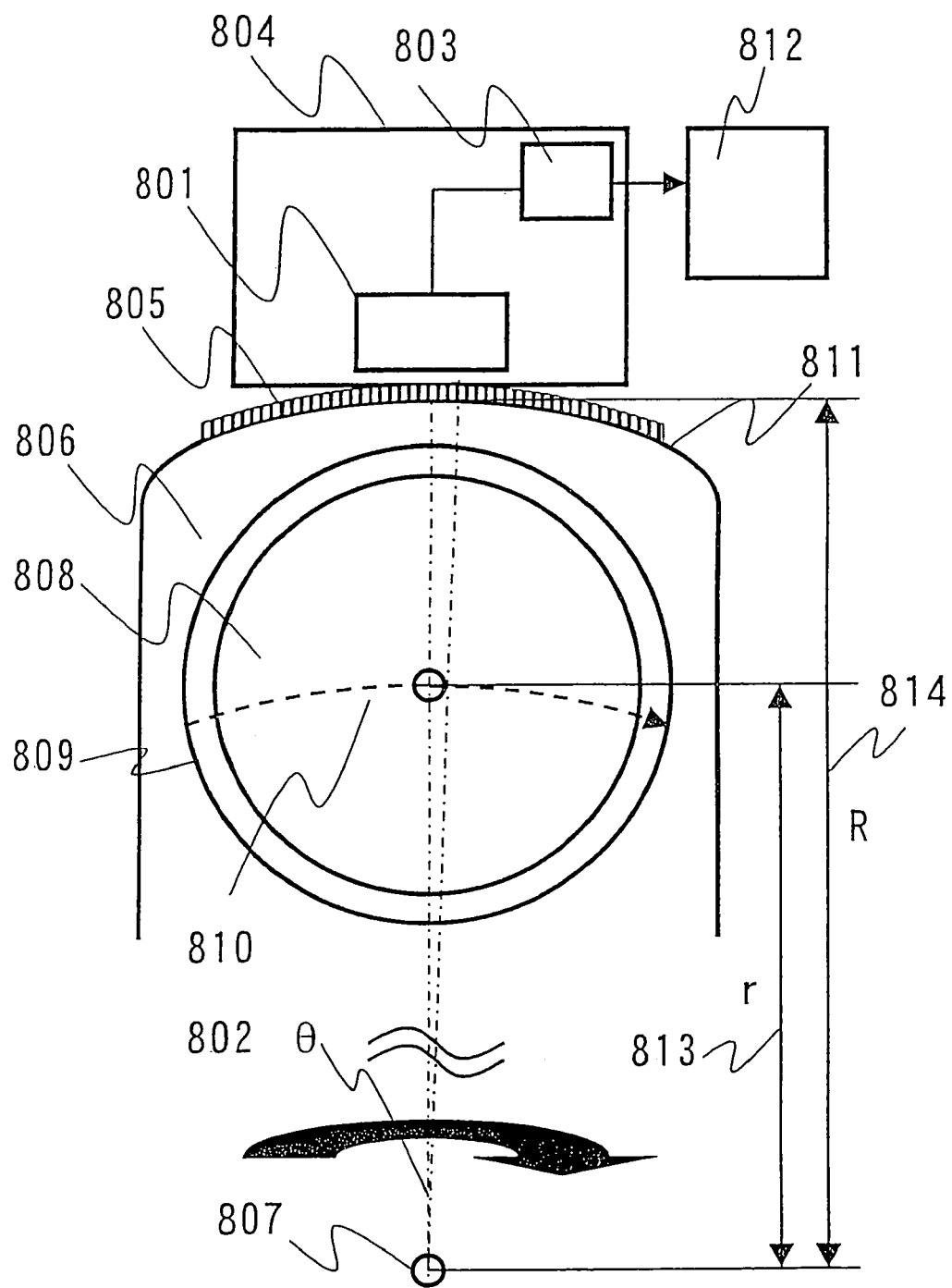
FIG. 5 is a figure showing an example of the recording point fluctuation detecting device which is a component of the apparatus of manufacturing the master disk according to the present invention.

Here, an example in which the hologram scale is used to detect the moving amount of the master disk is described. However, as shown in FIG. 5, a similar effect can also be obtained by a method in which a magnetically recorded pattern is used as a scale 805 and the magnetized pattern of the scale 805 is read by a magnetic head 801.

Figure 6:
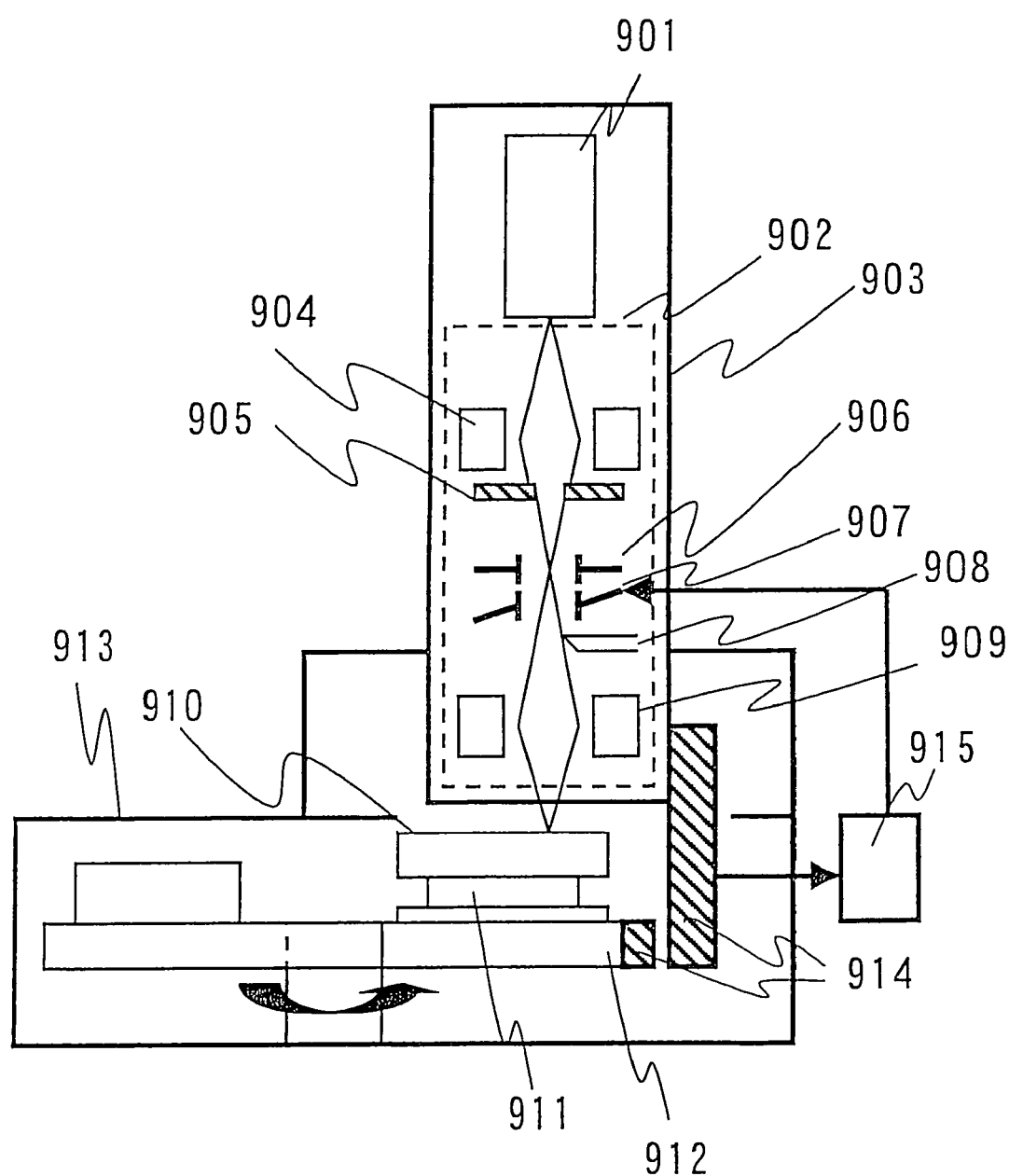
FIG. 6 is a figure showing an example of a recording point fluctuation controlling device which is a part of the apparatus of manufacturing the master disk according to the present invention.

Further, it is possible to suppress the recording point fluctuation detected by a following method, and to reduce the unequal track pitch of the pattern recorded on the master disk. FIG. 6 shows an example of the method.

The difference between an actual relative position between an electronic column 903 and a horizontally moving device 912, which is detected by a recording point fluctuation detecting device 914, and a desired relative position at the time of recording on the master disk is calculated by means of an error signal detecting device 915 corresponding to the comparing section according to the present invention. That is, the difference between the moving distance on the path of the center point of a resist master disk 910 and the moving distance on the straight line of the center point of the resist master disk 910 is obtained. Since the difference between the moving distances can be predetermined, the moving distances on each of the paths are obtained, and thereafter, a correspondence relationship between the distances may be prepared as a table, to obtain the difference between the moving distances from the table. The information on the unequal track pitch observed from this error signal is fed back to an electron beam deflecting electrode 907. In the electron beam deflecting electrode 907, the electron beam passing through the center of the electrode can be deflected in the direction substantially the same as the moving direction of the horizontally moving device 912, so that the amount of error measured by the error signal detecting device 915 is canceled by deflecting the electron beam. Thereby, it is possible to correct the fluctuation of the track pitch of an optical disk, and the like, which is recorded on the resist master disk 910.

With the method of manufacturing the master disks, as described above, the information on the relative position between the horizontally moving device which moves with curvature and the recording beam focusing device can be accurately measured. Further, the accuracy of feeding pattern of the disk can be improved by controlling the deviation and fluctuation of the feeding pitch on the basis of the information on the relative position.

Figure 7:
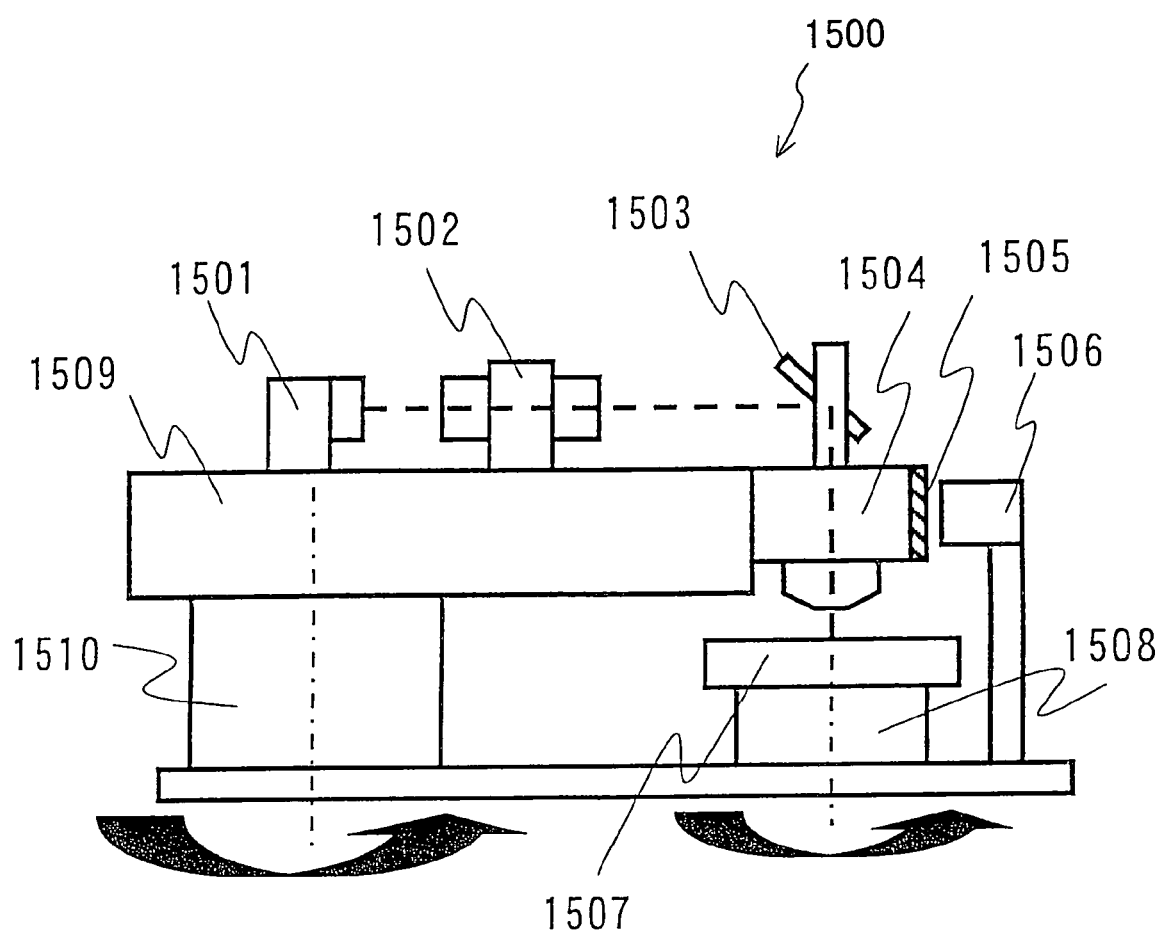
FIG. 7 is a figure showing an example of a laser recording device which is a part of the apparatus of manufacturing the master disk according to the present invention.

In the above description, an example using the electron beam recording apparatus 500 is explained. However, similar recording point fluctuation detection can also be performed by using a laser recording device in which a laser is used as a source of light beam. FIG. 7 shows an example of the laser recording device 1500. A laser beam emitted from a laser beam source 1501 passes through an acoustooptical deflector (AOD) 1502. Then, the laser beam is bent by a mirror 1503 toward a resist master disk 1507, and is condensed by a recording beam focusing device 1504 on the resist master disk 1507. The resist master disk 1507 is held by a rotating device 1508. The recording beam focusing device 1504 is fixed to a swing arm 1509, and the position of the recording beam focusing device 1504 relative to the resist master disk 1507 is moved with curvature by rotating the swing arm 1509 about an axis of rotation 1510 as a center. A scale 1505 is provided on the side surface portion of the recording beam focusing device 1504, and the information of the scale 1505 is detected by a scale information detecting device 1506. As the scale 1505 and the scale information detecting device 1506, those in which measurement is performed by using the laser interference, and those in which measurement is performed by reading a magnetically recorded pattern, and the like, are used.

Figure 8:
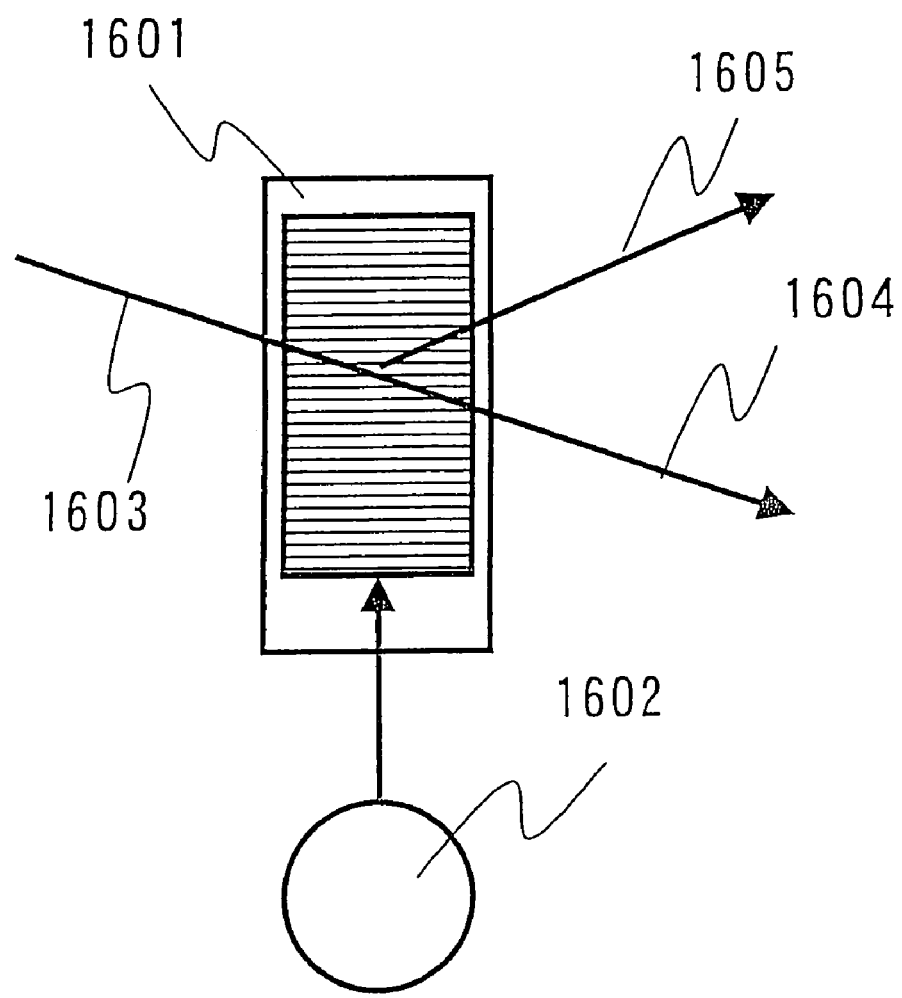
FIG. 8 is a figure showing an operation of AOD which is a part of the apparatus of manufacturing the master disk according to the present invention.

The AOD 1502 is capable of deflecting the laser beam to the feeding direction of the swing arm 1509. FIG. 8 shows a structure of the AOD. An ultrasonic wave is inputted from a transducer 1602 to an AOD element 1601. A refractive index distribution is generated in the element by the ultrasonic wave, so as to constitute a diffraction grating. When a laser beam 1603 is incident on the element, the diffraction of the laser beam occurs. The diffraction angle of the diffracted light beam 1605 is changed by a signal inputted to the AOD element 1601, so that the laser beam 1603 can be deflected in accordance with the input signal. The laser beam thus deflected is used as a recording beam. With such an operation, when an error is caused between an actual positional relationship of the laser beam relative to the resist master disk 1507, which is measured by the scale 1505 and the scale information detecting device 1506, and a desired positional relationship, the error can be corrected by driving the AOD 1502.

Figure 9:
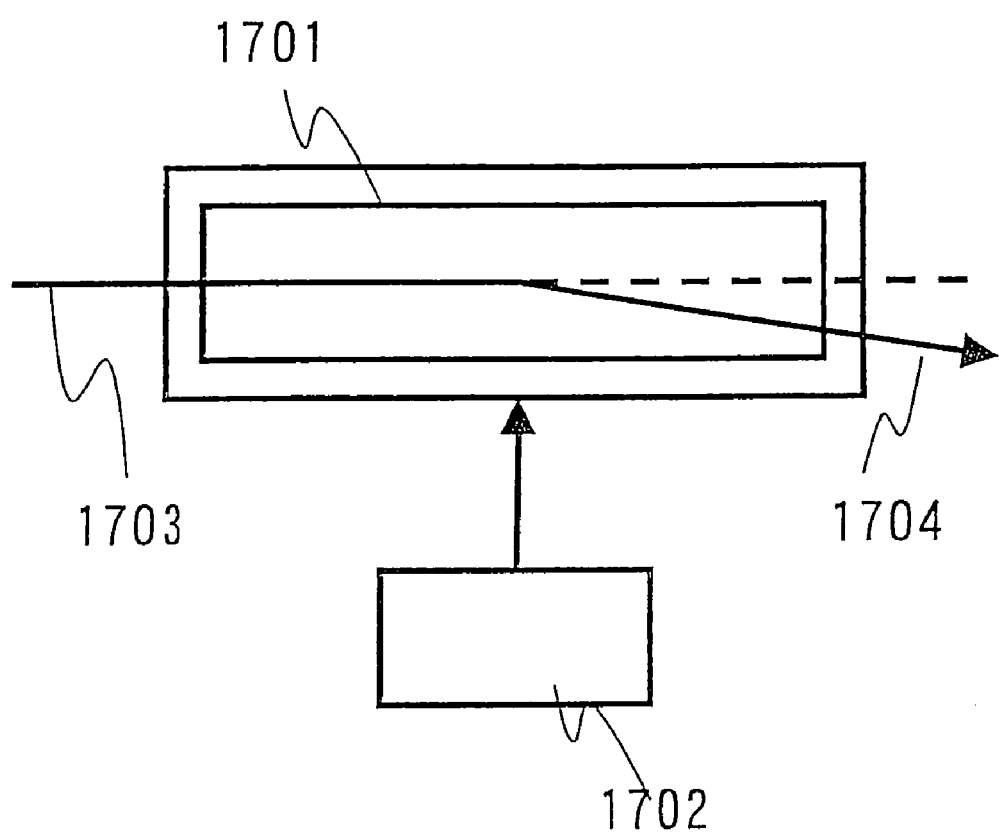
FIG. 9 is a figure showing an operation of EOD which is a part of the apparatus of manufacturing the master disk according to the present invention.
Figure 10:
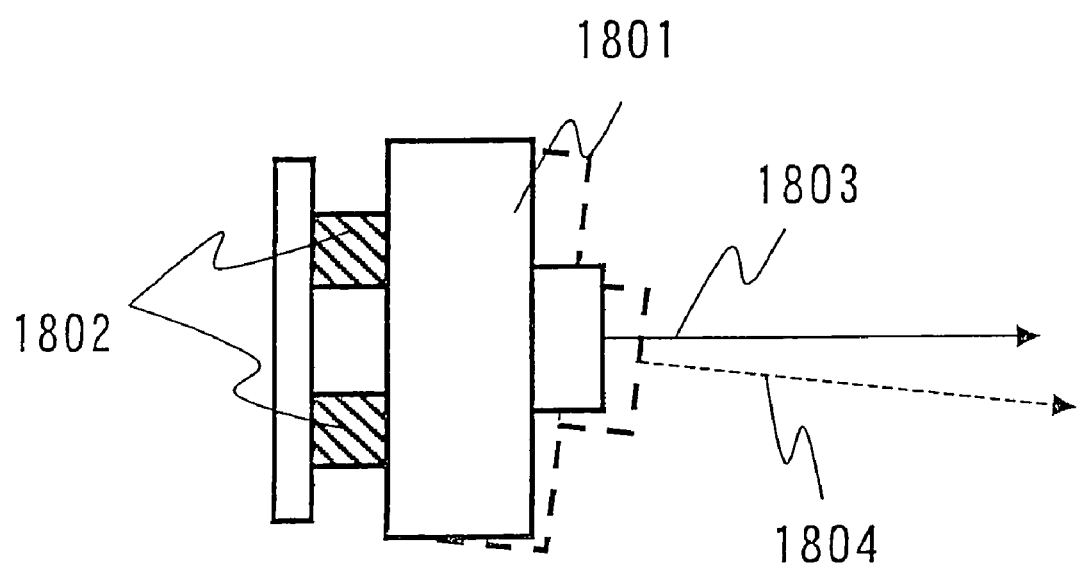
FIG. 10 is a figure showing a structure of a semiconductor laser beam source which is a part of the apparatus of manufacturing the master disk according to the present invention.

Further, as the deflecting device of the recording beam, not only the AOD as shown in FIG. 8, but an EOD element 1701 as shown in FIG. 9 can also be used. In FIG. 9, a refractive index distribution in the EOD element 1701 is controlled by a signal inputted to the EOD element 1701 from a controller 1702, so as to make the laser beam 1703 deflected in the direction 1704. Further, as shown in FIG. 10, the direction 1803 of the laser beam may be deflected to the direction 1804 by moving the direction of a semiconductor laser 1801 used as the source of light beam by a piezoelectric element 1802 and the like.

Embodiment 2

Figure 11:
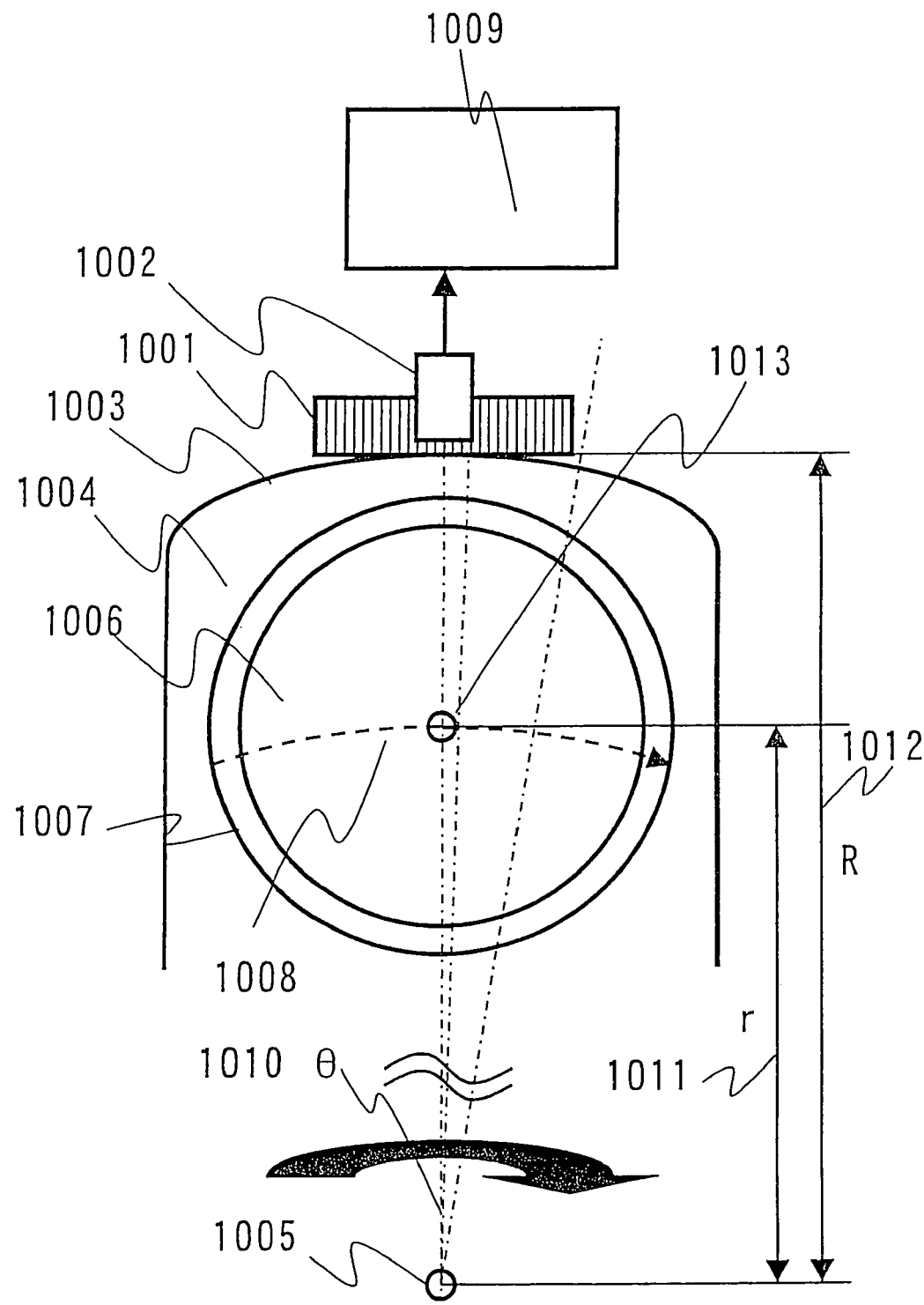
FIG. 11 is a figure showing an example of a recording point fluctuation detecting device which is a part of an apparatus of manufacturing a master disk of an embodiment 2 according to the present invention.

FIG. 11 shows an example of a recording point fluctuation detecting device which constitutes a part of an apparatus of manufacturing a master disk according to an embodiment 2 of the present invention.

A resist master disk 1006 is held on a rotating device 1007, and the rotating device 1007 is provided on a horizontally moving device 1004. The horizontally moving device 1004 rotates about a rotation center 1005, and moves the rotating device 1007 with curvature. A straight scale 1001, the longitudinal direction of which is almost the same as the peripheral direction of the resist master disk 1006, and which has hologram gratings formed at almost the same intervals, is provided so as to be in contact with a side surface portion 1003 having a shape similar to a rotation orbit 1008 of the horizontally moving device 1004. The contact point between the scale 1001 and the horizontally moving device 1004 is provided on a straight line which connects the rotation center 1005 of the horizontally moving device with a rotation center 1013 of the resist master disk 1006, as shown in FIG. 11. Further, in relation to the scale 1001, a scale information detecting device 1002 which has a laser beam source, a laser beam receiving section and an interference pattern measuring device, is provided on the rotating device 1007 so as to face the surface of the scale 1001. In this way, a master disk moving amount detecting device is formed by the scale 1001 and the scale information detecting device 1002.

An output signal of the master disk moving amount detecting device is inputted to a recording point moving amount correcting device 1009.

The scale information detecting device 1002 is connected to the electronic column 503, and the scale 1001 is connected to the horizontally moving device 1004.

In the scale information detecting device 1002, a laser beam is irradiated to the hologram pattern provided for the scale 1001, and a light and dark pattern of interference fringes which are generated by making diffracted light beams reflected from the hologram pattern interfere with each other, is counted by the interference pattern measuring device, whereby the position detection can be performed.

Figure 12:
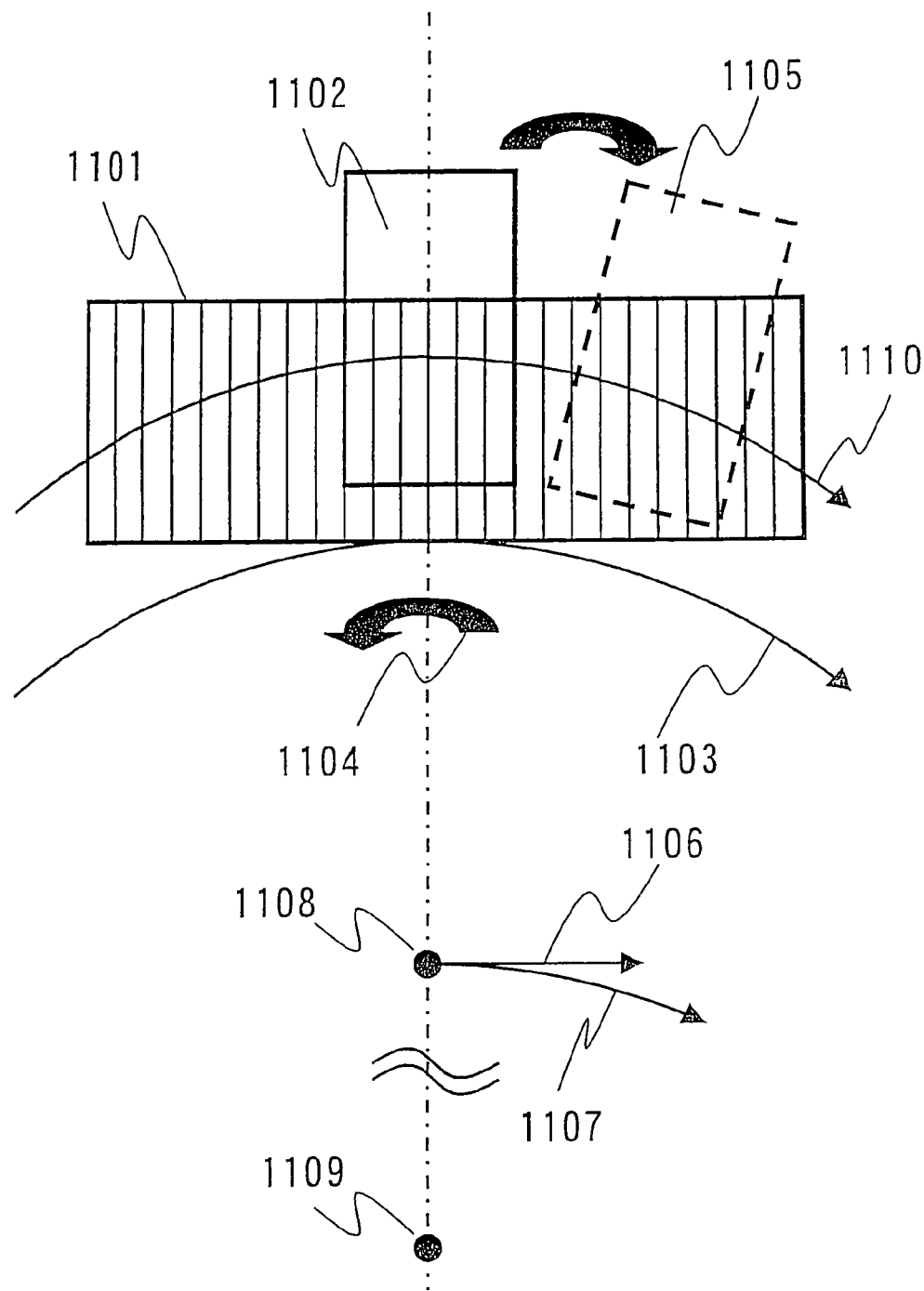
FIG. 12 is an enlarged illustration of an operation of a master disk moving amount detecting device in a method of manufacturing a master disk according to the present invention.

FIG. 12 is an enlarged illustration of the movement of the master disk moving amount detecting device. A grating-like hologram pattern is formed in a scale 1101, to which a laser beam is irradiated from a scale information detecting device 1102, and diffracted light beams are made to interfere with each other to form interference fringes, which is detected by a laser beam receiving section in the scale information detecting device 1102. By counting the light and dark pattern of the interference fringes, the position of the horizontally moving device 1004 can be measured. When the horizontally moving device 1004 is moved with curvature along a rotation orbit 1103 in a direction 1104, the scale information detecting device 1102 moves to a position 1105. At this time, the scale 1101 and the scale information detecting device 1102 in the position 1105 are arranged to oppose to each other at an angle as shown in FIG. 12.

When the rotation center of the resist master disk 1006 is denoted by reference numeral 1108, the direction to be recorded is shown by a radial direction 1106 of the resist master disk 1006. In the resist master disk 1006, the track pitch needs to be recorded with equal intervals in this direction. However, the path of the recording beam irradiated on the resist master disk 1006 passes through the orbit 1107, and hence, a correcting operation is needed.

However, as shown in FIG. 12, when the scale 1101 is provided so as to intersect almost perpendicularly a straight line connecting the rotation center 1108 of the resist master disk 1006 with a rotation center 1109 of the horizontally moving device 1004, the position of the laser beam irradiated to the scale 1101 is also moved with curvature of a path, as shown in an orbit 1110, similar to the rotation orbit 1103 of the horizontally moving device 1004, and the path 1107 of the recording beam. As a result, the interval of the interference fringes is also increased as the inclination between the scale 1101 and the scale information detecting device 1102 is increased. The increasing rate of the interference fringe interval is the same as the rate at which the moving amount of the irradiation position of the recording beam in the radial direction 1106 of the resist master disk 1006 is changed by the curvature. Therefore, when the horizontally moving device 1004 is driven so as to make the intervals of the interference fringes equal to each other, the track pitch of an optical disk can also be recorded with equal intervals.

Further, the position of the reference point (origin) of the scale can be determined by a method as described below. For example, a range in which the horizontally moving device 1004 is allowed to be moved is limited mechanically, and the origin is set at the limit point of the moving range. Further, a laser interference length measuring apparatus of measuring the reference point, and the like, is provided in the vacuum vessel, and arranged to be capable of measuring a distance to the side surface portion of the horizontal moving device. The distance to the horizontally moving device is measured when the horizontally moving device reaches the reference point, and the point at which the horizontally moving device is moved to reach a predetermined distance, is set as the origin.

The direction of the scale 1101 with respect to the scale information detecting device 1102 is inclined as shown by the position 1105, as the resist master disk 1006 is moved by the horizontally moving device 1004, so that the length and the width of the scale 1101 are physically restricted. Further, when the inclination of the grating pattern with respect to the laser and to the laser beam receiving section is excessively increased, the interference fringes cannot be detected, so that the length and the width of the scale 1101 are also physically restricted.

For example, when the distance from the rotation center 1109 of the horizontally moving device 1004 to the contact point between the scale 1101 and the horizontally moving device 1004 is set to 50 cm, the distance from the rotation center 1109 to the rotation center 1108 of the resist master disk 1006 is set to 40 cm, a recording radius of the optical disk recorded on the resist master disk 1006 is set from 0 mm up to 60 mm, the scale 1101 needs to have a length of about 7.5 mm from the contact point with the horizontally moving device 1004, and a width of at least 5.5 mm. The scale information detecting device 1102 also needs to have a stroke enough to detect the scale information with the width of 5.5 mm. Further, the inclination of 0.15 rad needs to be allowed to make the scale information detecting device 1102 detect the information of the scale 1101.

Figure 13:
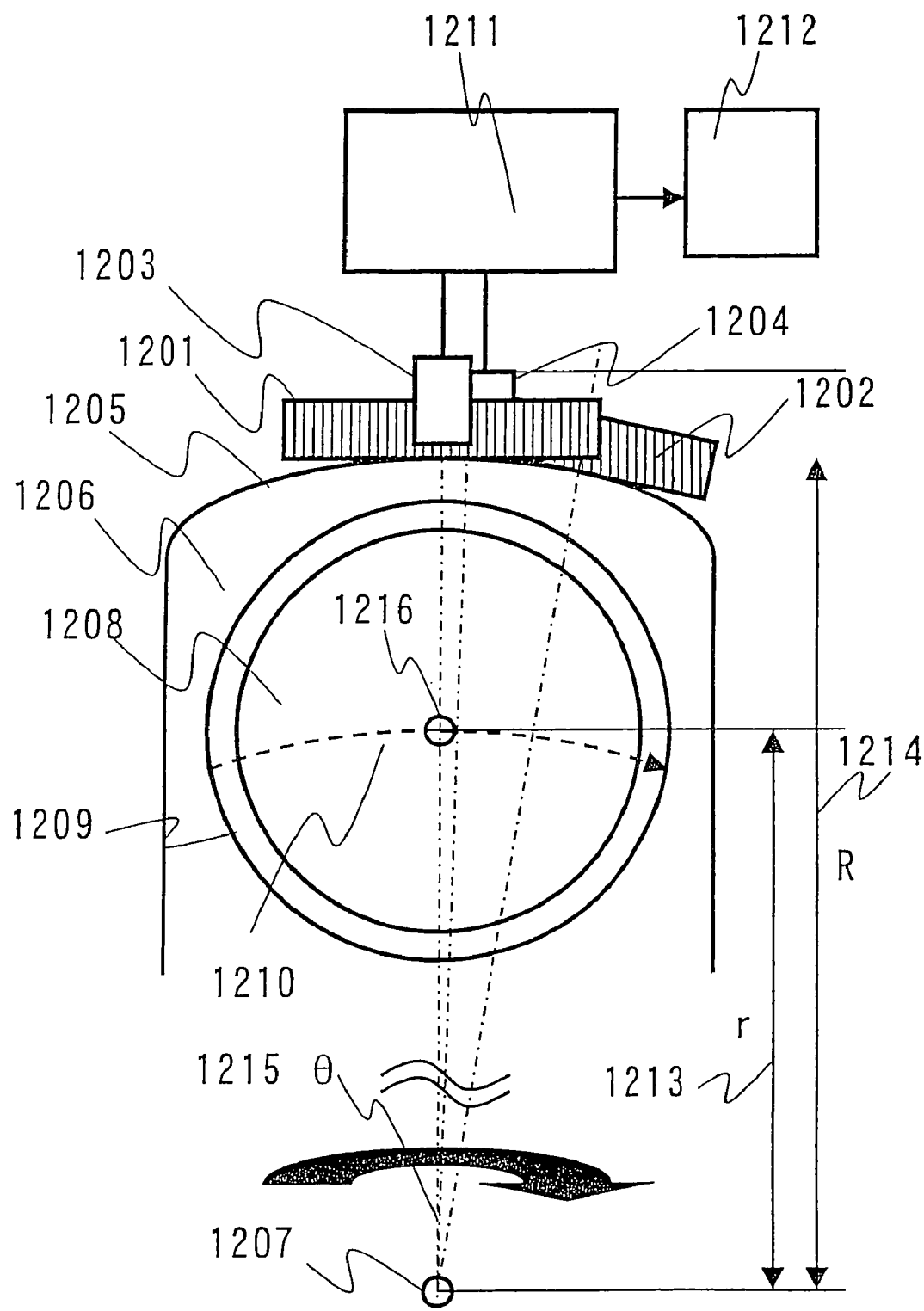
FIG. 13 is a figure showing the recording point fluctuation detecting device provided with a plurality of scales and scale information detecting devices, which are a part of the apparatus of manufacturing the master disk according to the present invention.

Further, there may be a case where the fluctuation of the recording point cannot be detected only by each one of the scale 1101 and the scale information detecting device 1102, when the recording area of the pattern recorded on the resist master disk 1006 is increased, or when the allowable value of the inclination between the scale information detecting device 1102 and the scale 1101 is small, and the like. In this case, as shown in FIG. 13, the measurement can be performed by providing a plurality of scales 1201, 1202 and of scale information detecting devices 1203, 1204.

A resist master disk 1208 is held on a rotating device 1209, and the rotating device 1209 is provided on a horizontally moving device 1206. The horizontally moving device 1206 is rotated about a rotation center 1207, and moves the rotating device 1209 with curvature. The scale 1201 and the scale 1202, each of which is straight and has a surface with a direction almost equal to the surface of the resist master disk 1208, and which has a hologram grating having almost equal grating intervals, are provided so as to be in contact with a side surface portion 1205 having a curvature almost equal to a rotation orbit 1210 of the horizontally moving device 1206. The contact point between the scale 1201 and the horizontally moving device 1206 is provided on the straight line connecting the rotation center 1207 of the horizontally moving device 1206 with a rotation center 1216 of the resist master disk 1208, as shown in FIG. 13. Further, the scale 1202 is provided at a position shifted in the R direction with respect to the scale 1201, and is also provided at a position shifted in the moving direction of the horizontally moving device 1206.

The scales are also provided so as to make a part of each of the scales overlap with each other, when seen from the surface side of the master disk. The two scales are overlapped in such a manner that the length of the scale 1201 is set to reach the straight line connecting the contact point between the scale 1202 and the side surface portion 1205 with the rotation center 1207. Further, the scale information detecting device 1203 which has a laser beam source, a laser beam receiving section and an interference pattern measuring device is provided so as to face the surface of the scale 1201.

Similarly, the scale information detecting device 1204 is also provided for the scale 1202. In this way, a master disk moving amount detecting device is formed by the scale 1201 and the scale information detecting device 1203, and a master disk moving amount detecting device is formed by the scale 1202 and the scale information detecting device 1204. An output signal of each of the master disk moving amount detecting devices is inputted to a master disk moving amount detection signal selecting device 1211, and one of the output signals of each of the master disk moving amount detection devices is selected and inputted to a recording point moving amount correcting device 1212. Further, the scale information detecting devices 1203, 1204 are connected to the electronic column 503, and the scales 1201, 1202 are connected to the horizontally moving device 1206. In the scale information detecting devices 1203, 1204, a laser beam is irradiated on the hologram pattern provided for the scales 1201, 1202, and the light and dark pattern of interference fringes generated by making the diffracted light beams reflected from the hologram pattern interfere with each other is counted by the interference pattern measuring device, whereby the position of the horizontally moving device 1206 can be detected.

The method of detecting the fluctuation of the recording point in the master disk moving amount detecting device which is constituted by the scale 1201 and the scale information detecting device 1203 is the same as described above.

Next, the movement at the time of switching operation from the master disk moving amount detecting device which is constituted by the scale 1201 and the scale information detecting device 1203 to the master disk moving amount detecting device which is constituted by the scale 1202 and the scale information detecting device 1204 is described.

Figure 14:
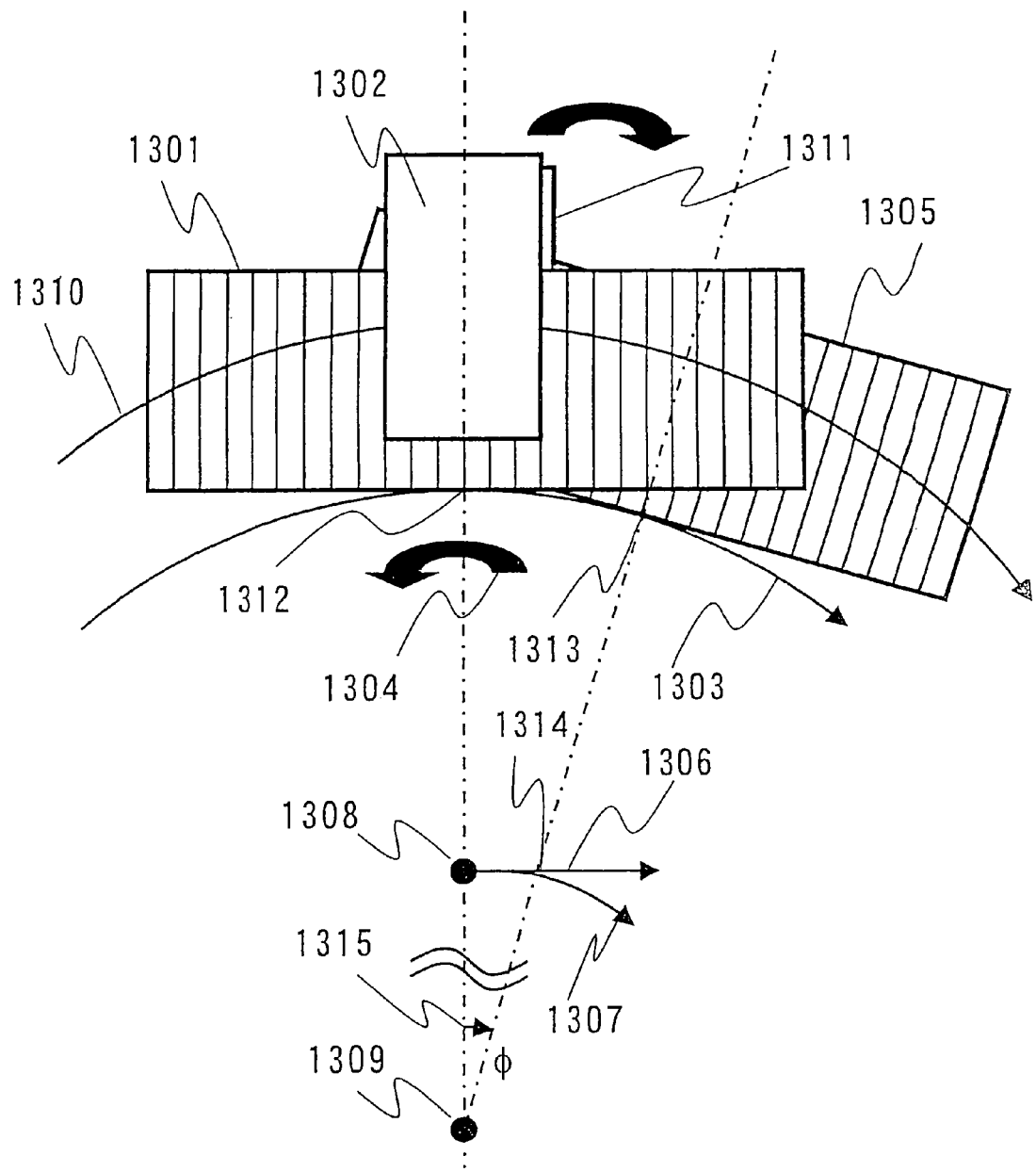
FIG. 14 is an enlarged illustration of the master disk moving amount detecting device which is a part of the apparatus of manufacturing the master disk according to the present invention.

FIG. 14 shows an enlarged illustration of the master disk moving amount detecting device. While the recording beam is moved from a rotation center 1308 of the resist master disk 1208 to a position 1314 at which a straight line connecting a rotation center 1309 of the horizontally moving device 1206 with a contact point 1313 between a scale 1305 and the horizontally moving device 1206, intersects a path 1307, the moving amount of the resist master disk 1208 is detected by a master disk moving amount detecting device which is constituted by a scale 1301 and a scale information detecting device 1302. As described above, the interval of the interference fringes obtained by the scale information detecting device 1302 is in proportional relation to the moving interval in the radial direction 1106 to be measured on the resist master disk 1208. Thus, when the horizontally moving device 1206 is driven to make the interval of the interference fringes equally spaced, the track pitch recorded on the resist master disk 1208 is also made to be equally spaced.

That is, the interval of the measured interference fringes is compared with the reference interval determined by the recording linear velocity on the resist master disk 1208 and the feeding pitch, in accordance with the rotation of the horizontally moving device 1206, and the horizontally moving device 1206 is driven so as to eliminate the difference between the both intervals, whereby the track pitch recorded on the resist master disk 1208 is made to have an equal interval. In this way, an operation to calculate the difference between the interval of the measured interference fringes and the reference interval in accordance with the rotation of the horizontally moving device 1206, is eventually equivalent to an operation to calculate the difference between the moving distance on the path of the center point of the resist master disk 1208 and the moving distance of the center point on the straight line, in accordance with the rotation of the horizontally moving device 1206.

When the recording beam reaches the position 1314, the detecting operation is switched to be performed by a master disk moving amount detecting device which is constituted by the scale 1305 and a scale information detecting device 1311. With this configuration, one half of the scale 1305 from the contact point 1313 between the scale 1305 and the side surface portion is used. Thereby, the spreading way of the feeding intervals in a direction 1306 to be measured is made to be in proportional relation to the spreading way of the interference fringes outputted from the scale 1305, so that the track pitch can be easily corrected.

The interval of the interference fringes detected by the scale information detecting device 1311 is in proportional relation to the moving interval in the direction 1306 to be measured on the resist master disk 1208. However, the factor of the output of the scale information detecting device 1311 is different from that of the output of the scale information detecting device 1302, and hence, a correcting operation needs to be performed to make both outputs match with each other. When an angle 1315 formed by a straight line connecting the rotation center 1309 of the horizontally moving device 1206 with a contact point 1312 between the scale 1301 and the horizontally moving device 1206, and a straight line connecting the rotation center 1309 of the horizontally moving device 1206 with the contact point 1313 between the scale 1305 and the horizontally moving device 1206, is set to $\phi$, the ratio between the output signal of the scale information detecting device 1302 and the output signal of the scale information detecting device 1311 is different by a factor of $\cos\phi$. For this reason, in the moment that the switching operation of the master disk moving amount detecting device is performed, correction to multiply the output of the scale information detecting device by $\cos\phi$ is performed in the recording point moving amount correcting device. With this configuration, the fluctuation of the recording point can be detected over a wide range by using a short and highly accurate scale, even in the case where a long accurate scale is difficult to be made, or where it is difficult to maintain the accuracy of a long scale due to expansion and contraction of the scale caused by temperature changes and the like.

Noted that in the present embodiment, the position detection is performed by using the hologram grating, but the similar effect can also be obtained by means of a method in which a magnetically recorded pattern is used as the scale and the magnetized pattern (corresponding to another example of the predetermined pattern according to the present invention) of the scale is read by a magnetic head.

Further, in the above description, the horizontally moving device is described as an arm having a longitudinal shape, but the horizontally moving device may have another shape such as a round shape. In this case, the center of the master disk is also different from the rotation center of the horizontally moving device, but if the moving distance of the center point of the master disk can be read at the end of the horizontally moving device, the effect similar to the above described effect can be obtained.

Figure 15:
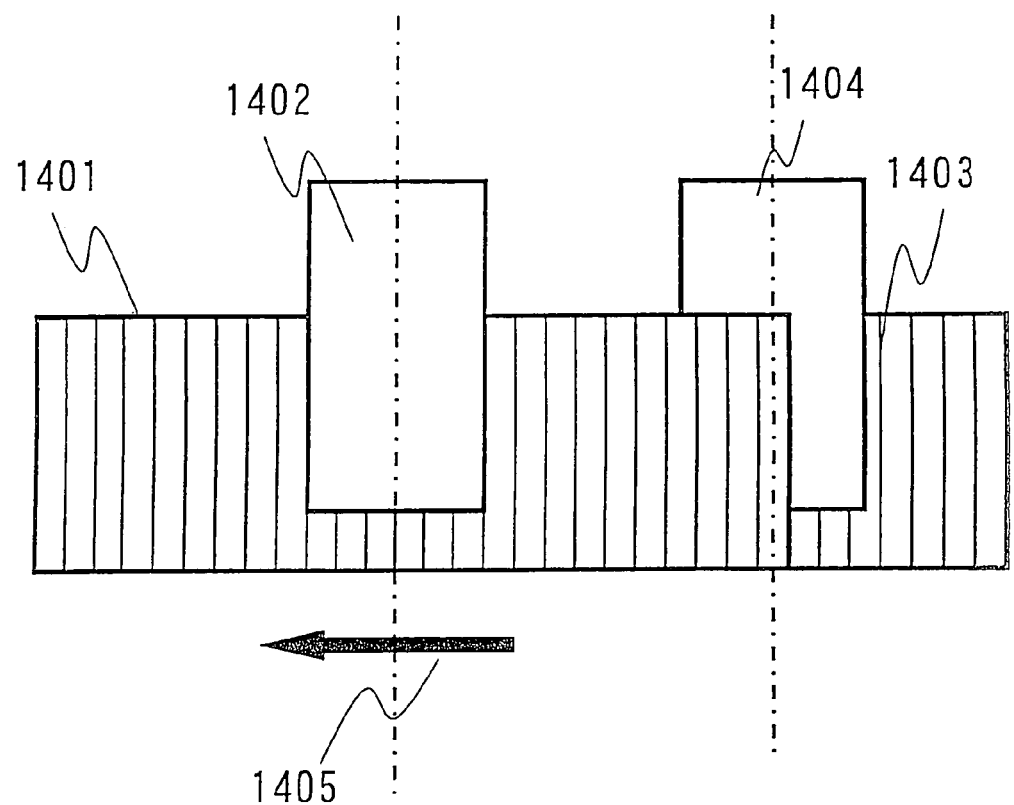
FIG. 15 is a figure showing an example of the recording point fluctuation detecting device in the horizontally moving device which moves linearly, which is a part of the apparatus of manufacturing the master disk according to the present invention.

Further, in the above description, the method of detecting the fluctuation of the recording point by using the horizontally moving device which moves with curvature, is explained. However, as shown in FIG. 15, in a horizontally moving device which linearly moves in the direction of an arrow 1405 as in the case of the screw feed type, it is also possible to perform the position detection over a wide range with the use of a short accurate scale, by arranging scales 1401, 1403, and scale information detecting devices 1402, 1404.

Further, in the case where three or more master disk moving amount detecting devices are used, it is possible to obtain the effect similar to the case where two master disk moving amount detecting devices are used.

Further, it is possible to suppress the fluctuation of the recording point and to reduce the unequal track pitch of the pattern recorded on the resist master disk by utilizing the detected recording point fluctuation information and driving the recording beam deflecting device.

Further, in the present embodiment, instead of reading the interval of the interference fringes from the straight hologram pattern, and feeding back the spread of the interval of the interference fringes to the rotation speed of the master disk, a method of feeding back the spread of the interference fringes to the beam control as in the embodiment 1 may also be considered. In such a case, the effect similar to the above described effect can also be obtained.

Noted that in the above description, the horizontal movement of each resist master disk is explained to be performed by the arm, but the other way of movement may be effected. Even in such a case, the effect similar to the above described effect can be obtained, by detecting the difference between the moving distance on the path of the center point of the resist master disk and the moving distance on the straight line.

Further, in the above description, the predetermined pattern according to the present invention is explained as the hologram pattern or the magnetic pattern, but the other pattern may also be formed. In such a case, the effect similar to the above described effect can be obtained, if the moving distance of the path of the center point from the pattern can be calculated.

In addition to the above description, a method of controlling the rotation speed of each rotating device, on the basis of the difference between the moving distance on the path of the center point of each resist master disk and the moving distance on the straight line, may also be considered. Even in such a case, the effect similar to the above described effect can be obtained. However, in this case, since the irradiation quantity of the electron beam or the laser beam in each pit is changed by the change of the rotation speed, the change of the quantity needs to be suppressed to be within an allowable range.

Embodiment 3

Figure 16:
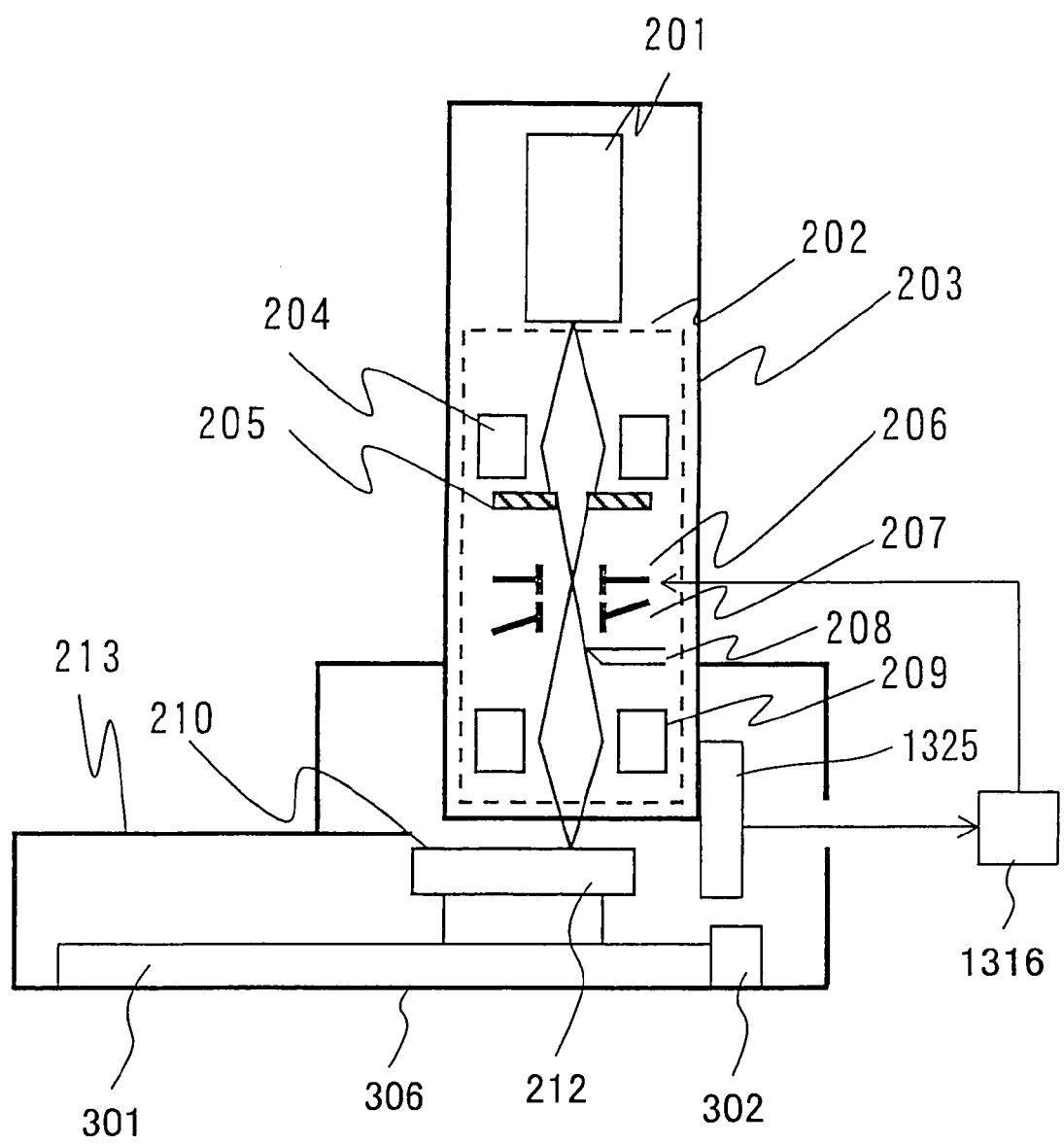
FIG. 16 is a cross-section showing a structure of an apparatus of manufacturing a master disk of an embodiment 3 according to the present invention.
Figure 17:
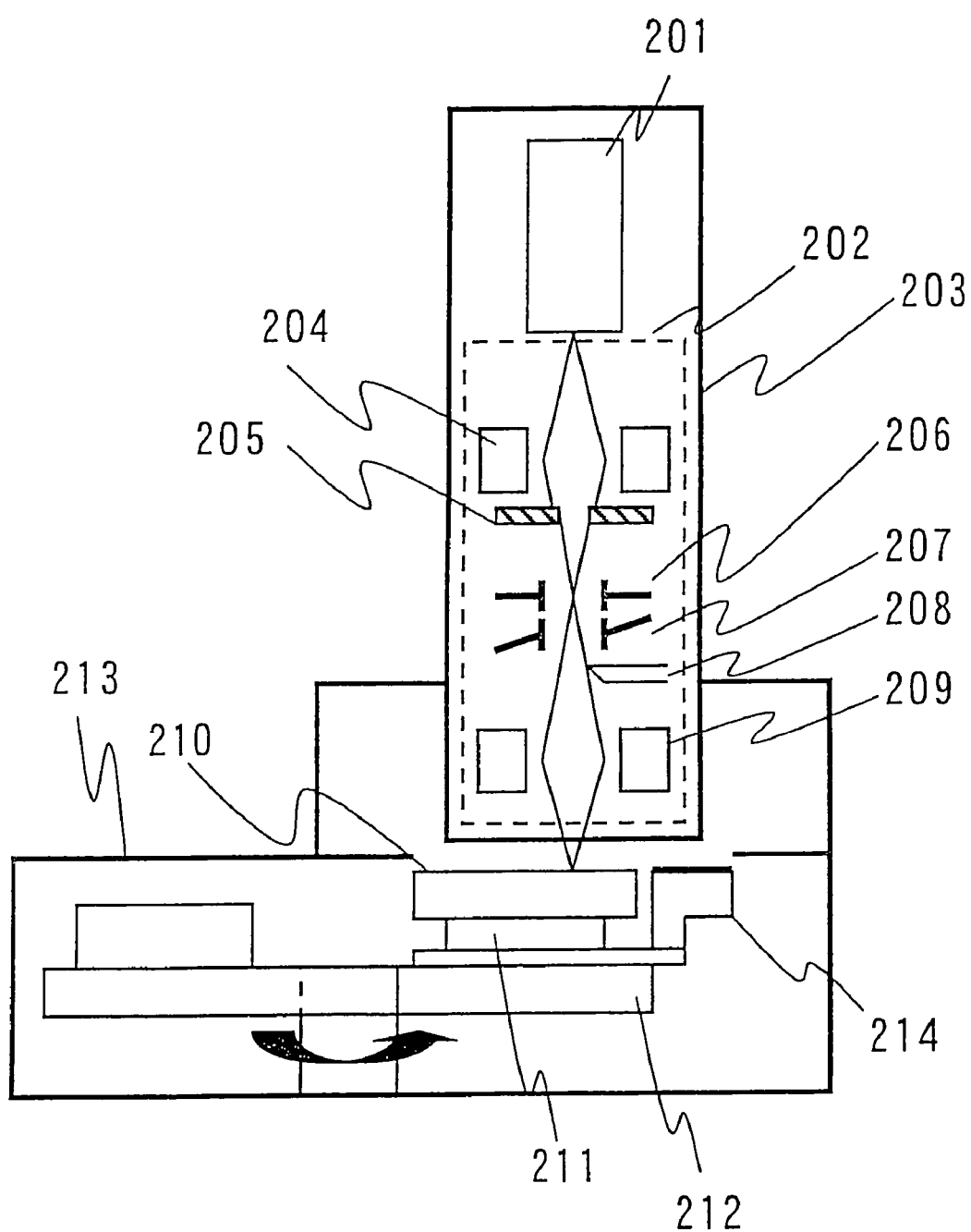
FIG. 17 is a figure showing an apparatus configuration of a conventional apparatus of manufacturing a master disk.
Figure 18:
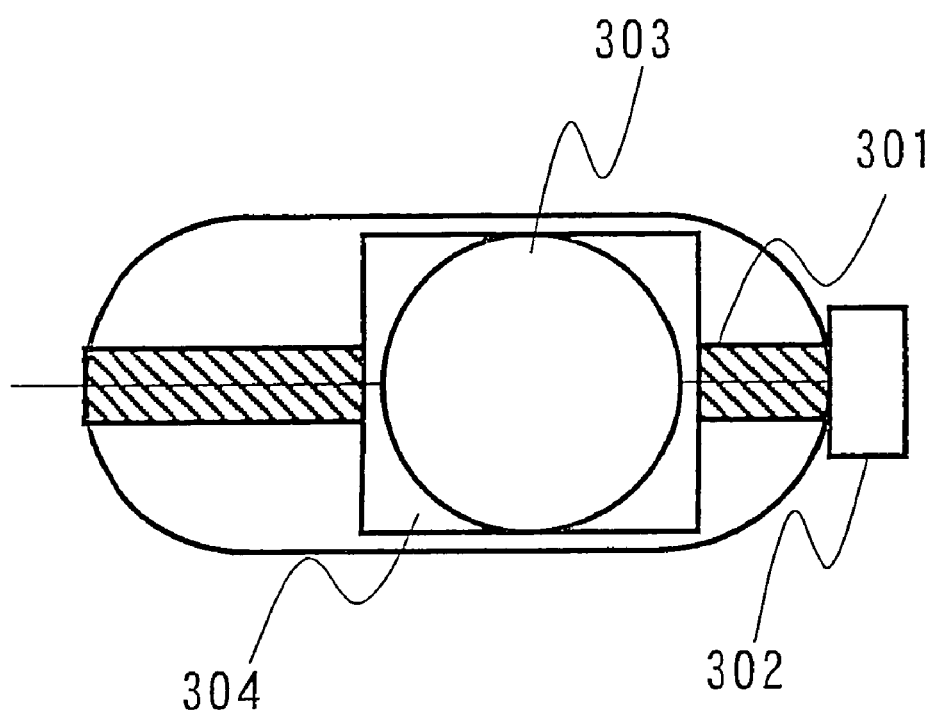
FIG. 18 is a figure showing an example of a horizontally moving device which moves linearly, in the conventional apparatus of manufacturing the master disk.
Figure 19:
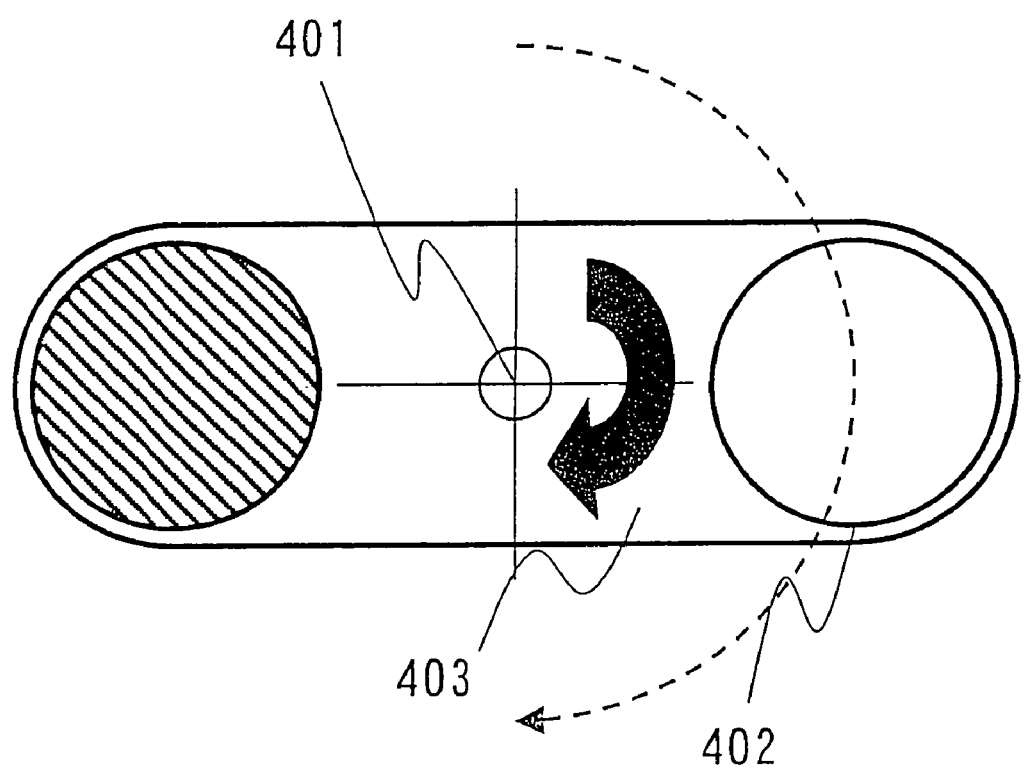
FIG. 19 is a figure showing an example of the horizontally moving device which moves with curvature, in the conventional apparatus of manufacturing the master disk.
Figure 20:
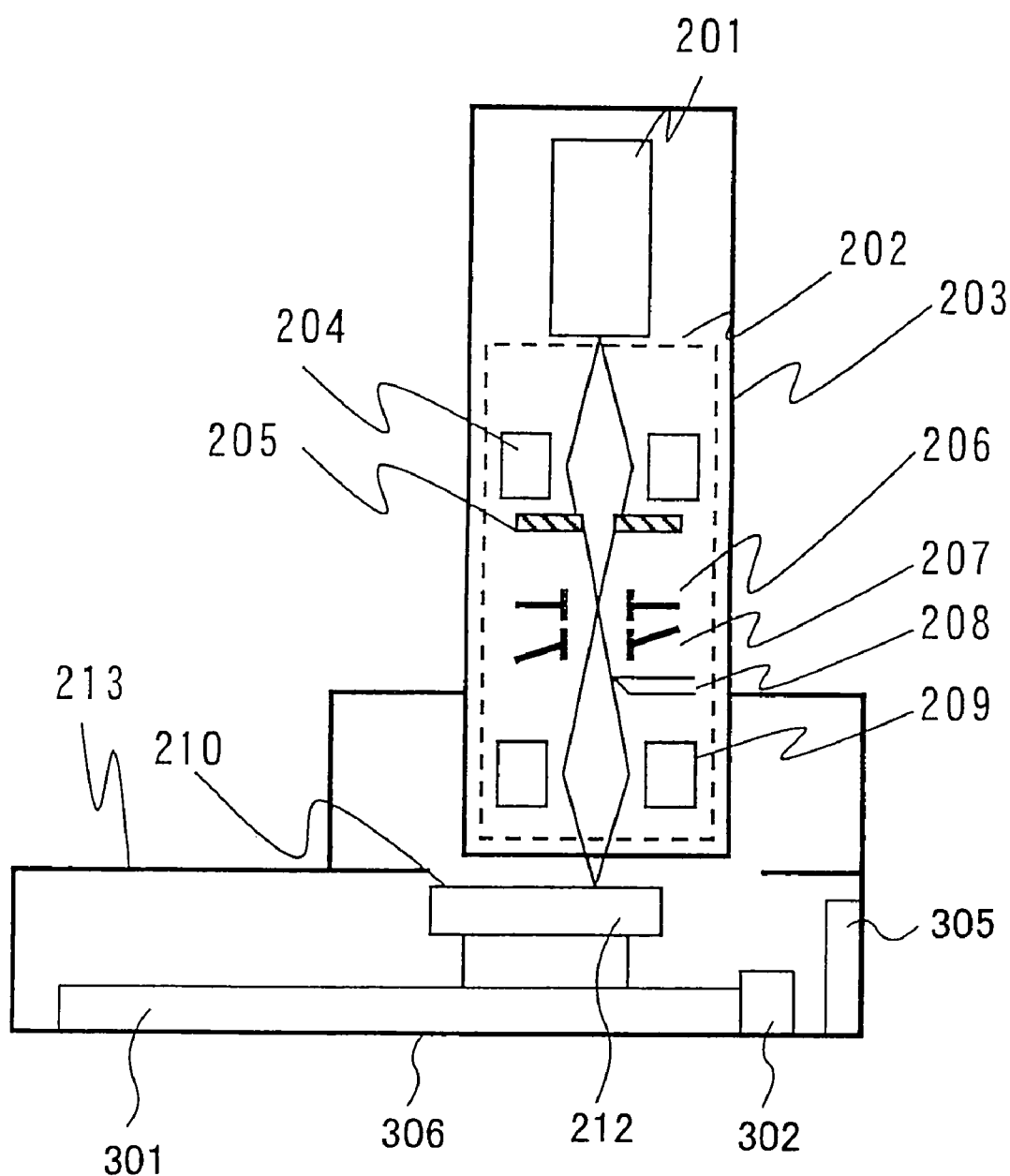
FIG. 20 is a cross-section showing a structure of the conventional apparatus of manufacturing the master disk utilizing the horizontally moving device which moves linearly.

FIG. 16 shows an apparatus of manufacturing a master disk of an embodiment 3 according to the present invention. Components identical to those in FIG. 20 are provided with the same reference numerals. The apparatus of manufacturing the master disk according to the present embodiment is different from the apparatus shown in FIG. 20 in that a laser interference length measuring meter 1325 which is an example of the moving distance reading device according to the present invention is provided for the electronic column 203. With this configuration, the moving distance of the horizontally moving device 212 is measured by the laser interference length measuring meter 1325 which is fixed to the electronic column 203, and the irradiation position of the electron beam is controlled by a control device 1316 on the basis of the measured result. Thereby, the deviation of the electron beam caused by vibration and deviation of the electronic column 203, and the like, can be corrected, so that a more accurate track pitch can be formed on the resist master disk 210. In the control device 1316, for example, a control operation is conceivable, in which information on the distance that the horizontally moving device 212 is to move during a predetermined time period is stored beforehand, and in which the deviation of the electron beam is detected by comparing the distance that the horizontally moving device 212 actually moves during the predetermined time period with the distance stored beforehand, and the like.

Noted that in the present embodiment, the laser interference length measuring meter 1325 need not always be fixed to the electronic column 203. That is, even in the case where the laser interference length measuring meter 1325 is provided to be spaced apart from the electronic column 203, if the distance between the laser interference length measuring meter 1325 and the electronic column 203, and the fluctuation of the distance can be measured, the effect similar to the above described effect can be obtained. In this case, the reference according to the present invention is also applied to the laser interference length measuring meter 1325.

Further, a case is also conceivable, where a reference to detect the vibration of the electronic column 203 and the like is provided separately from the laser interference length measuring meter 1325. In this case, if there is a predetermined relationship between the reference and the electronic column 203 (namely, a fixed relationship or a relationship to make it possible to read the distance between the reference and the electronic column), the effect similar to the above described effect can be obtained.

Noted that in the embodiments 1, 2, the recording point fluctuation detecting devices 514, 914 are explained as being fixed to the electronic columns 503, 903, but as described above, the recording point fluctuation detecting devices 514, 914 and the electronic columns 503, 903 may be provided in a state where the distance between the recording point fluctuation detecting devices and the electronic columns are read.

Noted that in the above description, the operation to control the predetermined manufacturing parameter corresponds to the operation to control the irradiation of the electron beam to the master disk, the operation to control the moving speed of the horizontally moving device, or the operation to control the rotation speed of the rotating device.

In the above description, the case where an optical master disk of high recording density such as a next generation recording medium is manufactured, is assumed. However, there may also be a case where the present invention is applied to manufacture a conventional optical master disk such as the CD and the DVD. In this case, the recording point fluctuation detecting devices 514, 914 are not necessary, and if the motor for driving the horizontally moving device has a sufficient precision, the moving distance of the horizontally moving device can be calculated by monitoring, for example, outputs of an encoder provided for the rotating shaft of the arm. It is also conceivable that absolute positions of the horizontally moving device corresponding to the elapsed time are stored beforehand in a table, and the outputs of the encoder are compared with the stored absolute positions by a comparing device so as to enable a controller to correct the deviation of the beam irradiation position, as described above.

Further, in the above description, an apparatus of manufacturing a master disk and a method of manufacturing the master disk by using the apparatus, are explained. However, when the deviation of the horizontally moving device is not corrected, the present invention can also be applied as an apparatus of inspecting the master disk, a method of inspecting the master disk, an apparatus of detecting a moving distance difference of the master disk, and a method of detecting a moving distance difference of the master disk.

With the method of manufacturing the master disk according to the present invention, the high feeding accuracy of the master disk can be realized by using the horizontally moving device which moves with curvature, and the relative positional relationship between the horizontally moving device and the recording beam focusing device can be grasped. Therefore, the present invention is useful as an apparatus of manufacturing a master disk, a method of detecting a moving distance difference of the master disk, an apparatus of detecting a moving distance difference of the master disk, a method of inspecting the master disk, and an apparatus of inspecting the master disk, and the like.

The invention claimed is:

1. A method of manufacturing a master disk, comprising:
   a step of rotating a master disk about a center point of the master disk, the master disk being mounted on a support arm having a rotational center other than the center point of the master disk;
   a step of moving said support arm about the rotational center of the support arm to thereby move the center point of the master disk in a rotational orbit, the moving causing a beam applied to the master disk to trace along an arc to move to a first position;
   a step of reading a moving distance of the master disk;
   a step of calculating a radial distance of the beam from the first position to the center point of the master disk;
   a step of determining a difference between the moving distance and the radial distance; and
   a step of controlling a position of the beam depending on the determined difference to move the beam to a new position on the arc to thereby facilitate uniformity in track pitches of the master disk.

2. The method of manufacturing the master disk according to claim 1, wherein the rotation of said master disk about the center point of the master disk is performed at one end of the support arm,
   wherein the support arm has a longitudinal shape, and
   wherein the moving distance is associated with a path followed by the center point of said master disk and is read by utilizing a predetermined pattern provided for on an end surface of said support arm.

3. The method of manufacturing the master disk according to claim 2, wherein the moving distance associated with the path followed by the center point of said master disk is read by irradiating a laser beam to a hologram pattern provided for on the end surface of the support arm, the hologram pattern being similar to the path of said center point, and by counting interference fringes of diffracted light beams of said irradiated laser beam.

4. The method of manufacturing the master disk according to claim 2, wherein the moving distance associated with the path followed by said center point is read by counting a magnetic pattern provided for on the end surface of said support arm by a magnetic head.

5. The method of manufacturing the master disk according to claim 2, wherein the moving distance associated with the path followed by said center point is read by irradiating a laser beam to a straight hologram pattern provided for on the end surface of said support arm, and by measuring an interval of interference fringes of diffracted light beams of said irradiated laser beam.

6. The method of manufacturing the master disk according to claim 5, wherein the measurement of intervals of said interference fringes is performed by using a limit point of the movement of said support arm as a reference.

7. The method of manufacturing the master disk according to claim 5, wherein the step of controlling the position of the beam is a step of controlling a rotation speed of the master disk.

8. The method of manufacturing the master disk according to claim 7, wherein said rotation speed is controlled on the basis of a measured value of an interval of interference fringes of said diffracted light beams, a recording linear velocity and a feeding pitch.

9. The method of manufacturing the master disk according to claim 1, wherein the step of controlling the position of the beam is a step of controlling a position of beam irradiation on said master disk.

10. The method of manufacturing the master disk according to claim 9, wherein the control of the position of said beam irradiation is performed by deflecting an electron beam by an electric field.

11. The method of manufacturing the master disk according to claim 9, wherein the control of the position of said beam irradiation is performed by deflecting a laser beam by using AOD.

12. The method of manufacturing the master disk according to claim 9, wherein the control of the position of said beam irradiation is performed by deflecting a laser beam by using EOD.

13. The method of manufacturing the master disk according to claim 9, wherein the control of the position of said beam irradiation is performed by deflecting a laser beam irradiated from a laser beam source by deflecting said laser beam source with a piezoelectric element.

14. The method of manufacturing the master disk according to claim 1, wherein the step of controlling the position of the beam is a step of controlling a moving speed of the master disk.

15. A method of detecting a moving distance difference of a master disk comprising:
   a step of rotating a master disk about a center point of the master disk, the master disk being mounted on a support arm having a rotational center other than the center point of the master disk;
   a step of moving said support arm about the rotational center of the support arm to thereby move the center point of the master disk in a rotational orbit, the moving causing a beam applied to the master disk to trace along an arc to move to a first position;
   a step of reading a moving distance of the master disk;
   a step of calculating a radial distance of the beam from the first position to the center point of the master disk;
   a step of detecting a difference between the moving distance and the radial distance; and
   a step of determining a new position of the beam depending on the detected difference, the new position being on the arc, to thereby facilitate uniformity in track pitches of the master disk.

* * * * *